US007598950B2

(12) United States Patent
Chang et al.

(10) Patent No.: US 7,598,950 B2
(45) Date of Patent: Oct. 6, 2009

(54) DISPLAY CONTROL DEVICE WITH MULTIPURPOSE OUTPUT DRIVER

(75) Inventors: Chih-Tien Chang, Jhubei (TW); Teng-Hann Huang, Kaohsiung (TW); Chao-Ping Huang, Hsinchu (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 452 days.

(21) Appl. No.: 11/700,013

(22) Filed: Jan. 31, 2007

(65) Prior Publication Data

US 2007/0126726 A1 Jun. 7, 2007

Related U.S. Application Data

(62) Division of application No. 10/670,253, filed on Sep. 26, 2003, now Pat. No. 7,274,361.

(51) Int. Cl.
*G06F 3/038* (2006.01)

(52) U.S. Cl. ......................... 345/204; 345/98; 345/100; 326/71; 326/78; 327/333

(58) Field of Classification Search ........... 345/98-100, 345/204; 326/30, 71, 78, 86; 327/100, 306, 327/333

See application file for complete search history.

(56) References Cited

U.S. PATENT DOCUMENTS

| | | | | | |
|---|---|---|---|---|---|
| 5,450,024 | A | * | 9/1995 | Ruegg | 326/66 |
| 5,612,635 | A | * | 3/1997 | Madhu et al. | 326/71 |
| 6,218,858 | B1 | * | 4/2001 | Menon et al. | 326/39 |
| 6,236,231 | B1 | | 5/2001 | Nguyen et al. | |
| 6,433,579 | B1 | | 8/2002 | Wang et al. | |
| 6,566,911 | B1 | | 5/2003 | Moyer | |
| 6,639,434 | B1 | * | 10/2003 | Rahman | 327/108 |
| 6,700,408 | B2 | * | 3/2004 | Lee | 326/86 |
| 6,856,178 | B1 | * | 2/2005 | Narayan | 327/108 |
| 6,859,074 | B2 | * | 2/2005 | Ajit | 327/108 |
| 6,927,608 | B1 | * | 8/2005 | Chen et al. | 327/108 |
| 7,005,891 | B2 | * | 2/2006 | Lee | 326/86 |
| 2002/0093498 | A1 | | 7/2002 | Park | |

* cited by examiner

*Primary Examiner*—Richard Hjerpe
*Assistant Examiner*—Kimnhung Nguyen
(74) *Attorney, Agent, or Firm*—WPAT., P.C.; Justin King

(57) ABSTRACT

A display control device includes a controller, a scaling engine, a timing controller, a selector and an interface circuit. The controller is for providing a mode-control signal. The scaling engine is for producing a first interface signal. The timing controller is for converting the first interface signal into a second interface signal. The selector selects either the first interface signal or the second interface signal to serve as a reference signal according to the mode-control signal. The interface circuit converts the reference signal into an output signal according to the mode-control signal. When the mode-control signal is under a first mode, the output signal is virtually the first interface signal. When the mode-control signal is under a second mode, the output signal is virtually the second interface signal. When the mode-control signal is under a third mode, the interface circuit converts the first interface signal into a third interface signal to serve as the output signal. When the mode-control signal is under a fourth mode, the interface circuit converts the second interface signal into a fourth interface signal to serve as the output signal.

21 Claims, 20 Drawing Sheets

1800

1112

DISPLAY CONTROL DEVICE WITH MULTIPURPOSE OUTPUT DRIVER

This application is a divisional of U.S. patent application Ser. No. 10/670,253 filed Sep. 26, 2003 now U.S. Pat. No. 7,274,361 which is incorporated herein by reference in its entirety.

BACKGROUND OF THE INVENTION

1. Field of the Invention

The invention relates to an interface driving technique capable of supporting multiple output specifications, and more particularly, to a display control device and an output driving device, and a control method using the same.

2. Description of the Prior Art

Liquid crystal display (LCD) panels are extensively applied in flat panel display or digital TV industries by being small in size and light in weight. A current LCD display is generally divided into two parts namely a panel module and a control module. Between the panel module and the control module is an interface, which may vary from transistor-transistor level (TTL) interface and low-voltage differential signaling (LVDS) to reduced swing differential signaling (RSDS). The control module is commonly provided with a display controller integrated circuit having integrated analog-digital-converter (ADC) and scaling engine. Wherein, the ADC is for converting analog image signals received by a display control unit to corresponding digital images signals. According to images resolutions required by the LCD display, the digital image signals are then processed with either down scaling or up scaling by the scaling engine.

FIG. 1 shows a schematic block diagram illustrating an LCD display utilizing a TTL interface as a transmission interface between a panel module and a display controller. Referring to FIG. 1, 100 represents a display controller, and 110 represents a panel module. The display controller 100 is coupled to the panel module 110 via a TTL interface 120. The display controller 100 has a scaling engine 102 that processes received image data with down-scaling or up-scaling according to an image resolution required. Signals sent by the TTL interface 120 include R/G/B pixel data, pixel clock CLK, horizontal synchronization HSYNC, vertical synchronization VSYNC and a display enable signal DE. The panel module 110 has a timing controller 112, a column driver 114, a row driver 116 and an LCD panel 118. Via the TTL interface 120, the panel module 110 receives the pixel data, horizontal synchronization HSYNC, vertical synchronization VSYNC and display enable signal DE, which are all processed by the timing controller 112 into column signals 113 and row signals 115 further connected to the column driver 114 and the row driver 116, respectively. The column driver 114 and the row driver 116 then proceed with column/row display control relative to the LCD panel 118, respectively.

Ordinary pixel data are 8-bit parallel data, and are transmitted by means of dual ports. Hence, 3×8×2=48 pins are needed for transmitting the R/G/B pixel data. Suppose four signals including the pixel clock CLK, horizontal synchronization HSYNC, vertical synchronization VSYNC and display enable signal DE are added, a number of pin count required by the TTL interface 120 sums up to about 52. Referring to FIG. 2 showing a timing diagram of individual signals of the TTL interface 120 shown in FIG. 1, RA[7:0] represent 8-bit parallel red pixel data transmitted via a port A, GA[7:0] represent 8-bit parallel green pixel data transmitted via the port A, BA[7:0] represent 8-bit parallel blue pixel data transmitted via the port A, RB[7:0] represent 8-bit parallel red pixel data transmitted via a port B, GB[7:0] represent 8-bit parallel green pixel data transmitted via the port B, and BB[7:0] represent 8-bit parallel blue pixel data transmitted via the port B.

FIG. 3 shows a schematic block diagram illustrating an LCD display utilizing a TTL/TCON interface as a transmission interface between a panel module and a display controller. Referring to FIG. 3, 300 represents a display controller, and 310 represents a panel module. The display controller 300 is coupled to the panel module 310 via a TTL/TCON interface 320. The display controller 300 has a scaling engine 302 and a timing controller 304. The scaling engine 302 processes received image data with down-scaling or up-scaling according to an image resolution required. For that the display controller 300 shown in FIG. 3 is provided with the timing controller 304, TTL signals outputted by the scaling engine 302 are converted into TTL/TCON signals. Therefore, signals sent by the TTL/TCON interface 320 include R/G/B pixel data, pixel clock CLK, start pulse signal and general-purpose outputs GPO. The panel module 310 has a column driver 312, a TTL row driver 314 and an LCD panel 316. Via the TTL/TCON interface 320, the panel module 310 receives the pixel data, pixel clock CLK, start pulse signal and general-purpose outputs GPO. The signals received are divided into column signals 311 and row signals 313 further connected to the column driver 312 and the TTL row driver 314, respectively. The column driver 312 and the TTL row driver 314 then proceed with column/row display control relative to the LCD panel 316, respectively.

Ordinary pixel data are 8-bit parallel data, and are transmitted by means of dual ports. Hence, 3×8×2=48 pins are needed for transmitting the R/G/B pixel data. Suppose signals including the pixel clock CLK, odd start pulse signal, even start pulse signal and general-purpose outputs GPO (generally requiring 5 to 7 signals) are added, a number of pin count required by the TTL/TCON interface 320 sums to about 56 to 58. Referring to FIG. 4 showing a timing diagram of individual signals of the TTL/TCON interface 320 shown in FIG. 3, RA[7:0] represent 8-bit parallel red pixel data transmitted via a port A, GA[7:0] represent 8-bit parallel green pixel data transmitted via the port A, BA[7:0] represent 8-bit parallel blue pixel data transmitted via the port A, RB[7:0] represent 8-bit parallel red pixel data transmitted via a port B, GB[7:0] represent 8-bit parallel green pixel data transmitted via the port B, and BB[7:0] represent 8-bit parallel blue pixel data transmitted via the port B.

FIG. 5 shows a schematic block diagram illustrating an LCD display utilizing an LVDS interface as a transmission interface between a panel module and a display controller. Referring to FIG. 5, 500 represents a display controller, and 510 represents a panel module. The display controller 500 is coupled to the panel module 510 via an LVDS interface 520. The display controller 500 has a scaling engine 502 and an LVDS transmitter 504. The scaling engine 502 processes received image data with down-scaling or up-scaling according to an image resolution required. The LVDS transmitter 504 is for converting TTL output signals 503 coming from the scaling engine 502 into LVDS signals, which are further sent to the panel module 510 via the LVDS interface 520. The panel module 510 also has an LVDS receiver 512, a timing controller 514, a column driver 516, a row driver 518 and an LCD panel 519. Via the LVDS interface 520, the panel module 510 receives LVDS signals and converts the received signals into TTL signals 513. The TTL signals 513 are processed into column signals 515 and row signals 517 further connected to the column driver 516 and the row driver 518, respectively. The column driver 515 and the row driver 517 then proceed with column/row display control relative to the LCD panel 519, respectively.

FIG. 6 shows a timing diagram of signals of the LVDS interface 520 shown in FIG. 5 in one format. Referring to FIG. 6, the LVDS interface 520 is divided into A and B links. The link A consists of LVACKP/N, LVA0P/N, LVA1P/N, LVA2P/N and LVA3P/N signal pairs. The link B consists of LVBCKP/N, LVB0P/N, LVB1P/N, LVB2P/N and LVB3P/N signal pairs. Because the LVDS interface 520 adopts differential signals, a suffix P/N indicates that each signal is composed of two signals. The signal pair LVACKP/N represents a clock signal pair sent via the link A. The signal pair LVBCKP/N represents a clock signal pair sent via the link B. In the link A, the signal pairs LVA0P/N, LVA1P/N, LVA2P/N and LVA3P/N serially transmit pixel data, horizontal synchronization HSYNC, vertical synchronization VSYNC and display enable signal DE. Within each clock cycle, each of the LVA0P/N, LVA1P/N, LVA2P/N and LVA3P/N signal pairs needs to transmit seven bit data. For instance, LVA0P/N is for transmitting bit data including GA2, RA7, RA6, RA5, RA4, RA3 and RA2. In link B, the signal pairs LVB0P/N, LVB1P/N, LVB2P/N and LVB3P/N serially transmit pixel data, horizontal synchronization HSYNC, vertical synchronization VSYNC and display enable signal DE. Within each clock cycle, each of the LVB0P/N, LVB1P/N, LVB2P/N and LVB3P/N signal pairs needs to transmit seven bit data. For instance, LVB0P/N is for transmitting bit data including GB2, RB7, RB6, RB5, RB4, RB3 and RB2. Referring to FIG. 6, those with a "*" symbol represent dummy bits. The LVDS interface 520 uses ten differential signals for transmission, and therefore better electromagnetic interference (EMI) immunity is obtained. In addition, a pin count required is reduced to as low as 20, which is not even half of that of a TTL interface or a TTL/TCON interface.

FIG. 7 shows a timing diagram of signals of the LVDS interface 520 shown in FIG. 5 in another format. A distinction is that the signals LVACKP/N, LVA0P/N, LVA1P/N, LVA2P/N, LVA3P/N, LVBCKP/N, LVB0P/N, LVB1P/N, LVB2P/N and LVB3P/N transmit different bit data. For instance, LVA0P/N is for transmitting serial bits including GA0, RA5, RA4, RA3, RA2, RA1 and RA0; and LVB0P/N is for transmitting serial bits including GB0, RB5, RB4, RB3, RB2, RB1 and RB0.

FIG. 8 shows a schematic block diagram illustrating an LCD display utilizing an RSDS/TCON interface as a transmission interface between a panel module and a display controller. Referring to FIG. 8, a symbol 800 represents a display controller, and a symbol 810 represents a panel module. The display controller 800 is coupled to the panel module 810 via an RSDS/TCON interface 820. The display controller 800 has a scaling engine 802, a timing controller 804 and an RSDS transmitter 806. The scaling engine 802 processes received pixel data with down-scaling or up-scaling according to an image resolution required. The timing controller 804 is for converting TTL signals 803 from the scaling engine 802 to TTL/TCON signals 805. The RSDS transmitter 806 is for converting the TTL/TCON signals 805 from the scaling engine 804 to RSDS/TCON signals, which are further sent to the panel module 810 via the RSDS/TCON interface 820. The panel module 810 also has a column driver 812, an RSDS row driver 814 and an LCD panel 816. Via the RSDS/TCON interface 820, the panel module 810 receives RSDS/TCON signals, which are processed into column signals 811 and row signals 813 further connected to the column driver 812 and the row driver 814, respectively. The column driver 812 and the row driver 814 then proceed with column/row display control relative to the LCD panel 816, respectively.

FIG. 9 shows a timing diagram illustrating the signals of the RSDS/TCON interface 820 shown in FIG. 8. Referring to FIG. 9, the RSDS/TCON interface 820 similarly transmits pixel data using ports A and B. RA[3:0]P/N represent four signal channels of red pixel data transmitted in parallel by the port A, GA[3:0]P/N represent four signal channels of green pixel data transmitted in parallel by the port A, and BA[3:0]P/N represent four signal channels of blue pixel data transmitted in parallel by the port A. RB[3:0]P/N represent four signal channels of red pixel data transmitted in parallel by the port B, GB[3:0]P/N represent four signal channels of green pixel data transmitted in parallel by the port B, and BB[3:0]P/N represent four signal channels of blue pixel data transmitted in parallel by the port B. For that the RSDS/TCON interface 820 adopts differential signals, a suffix P/N indicates that each signal is composed of two signals. Moreover, RSCKAP/N and RSCKBP/N represent two clock channels by the port A and the port B, each of which also adopts differential signals. In addition, the odd start pulse signals, the even start pulse signals and the general-purpose outputs (GPO) remain as TTL/TCON signals.

The signal channels RA[3:0]P/N, GA[3:0]P/N and BA[3:0]P/N send the pixel data RA[7:0]/GA[7:0]/BA[7:0] in serial transmission, and hence within each clock cycle, each of the signal channels RA[3:0]P/N, GA[3:0]P/N and BA[3:0]P/N needs to transmit two bit data. For instance, RA0P/N is for transmitting RA0 and RA1; RA1P/N is for transmitting RA2 and RA3; RA2P/N is for transmitting RA4 and RA5; and RA3P/N is for transmitting RA6 and RA7. The signal channels RB[3:0]P/N, GB[3:0]P/N and BB[3:0]P/N also send the pixel data RB[7:0]/GB[7:0]/BB[7:0] in serial transmission, and hence within each clock cycle, each of the signal channels RB[3:0]P/N, GB[3:0]P/N and BB[3:0]P/N needs to transmit two bit data. For instance, BB0P/N is for transmitting BB0 and BB1; BB1P/N is for transmitting BB2 and BB3; BB2P/N is for transmitting BB4 and BB5; and BB3P/N is for transmitting BB6 and BB7. Because the RSDS/TCON interface 820 uses 26 differential signal channels for transmission, better EMI immunity is obtained.

It is observed from the above descriptions that, in cases of different transmission interfaces utilized by panel modules, it is essential to design corresponding display controllers. As a result, costs of circuit designs and integrated circuit manufacturing are increased.

SUMMARY OF THE INVENTION

An object of the invention is to provide a display control device and an output driver capable of supporting multiple interfaces, and a control method using the same, thereby simultaneously supporting multiple interface specifications.

The other object of the invention is to provide a display control device and an output driver capable of supporting multiple interfaces, and a control method using the same, thereby making a single control circuit compatible with panel modules having different interface specifications.

To accomplishing the aforesaid objects, the invention is completed by a display control device. The display control device comprises a controller, a scaling engine, a timing controller, a selector and an interface circuit. The controller is for providing controls signals of a specific mode. The scaling engine is for producing a first interface signal. The timing controller is for converting the first interface signal into a second interface signal. The selector is for selecting either the first interface signal or the second interface signal according to the mode of the control signal, so as to provide and output a reference signal. The interface circuit is for converting the reference signal into an output signal according to the mode of the control signal. When the mode of the control signal is under a first mode, the output signal is virtually the first interface signal; and when the mode of the control signal is under a second mode, the output signal is virtually the second interface signal. When the mode of the control signal is under a third mode, the interface circuits converts the first interface signal into a third interface signals that is to serve as the output signal; and when the mode of the control signal is under a fourth mode, the interface circuits converts the second interface signal into a fourth interface signal that is to serve as the output signal.

Moreover, a display control method according to the invention comprises the steps of:

a) providing a mode-control signal and a first interface signal;

b) converting the first interface signal into a second interface signal;

c) selecting either the first interface signal or the second interface signal as a reference signal according to the mode-control signal; and d) converting the reference signal into an output signal according to the mode-control signal.

Wherein, when the mode-control signal is under a first mode, the output signal is virtually the first interface signal; when the mode-control signal is under a second mode, the output signal is virtually the second interface signal; when the mode-control signal is under a third mode, the first interface signal is converted into a third interface signal to serve as the output signal; and when the mode-control signal is under a fourth mode, the second interface signal is converted into a fourth interface signal to serve as the output signal.

Furthermore, an output driving device according to the invention comprises a first bonding pad, a second bonding pad, a first driver, a second driver and a third driver. The first driver is for transmitting a first signal to the first bonding pad for output. The second driver is for transmitting a second signal to the second bonding pad for output. The third driver is for converting a third signal into a differential signal that is further transmitted to the first bonding pad and the second bonding pad for output. When the first signal is outputted via the first bonding pad and the second signal is outputted via from the second bonding pad, the third driver is disabled. When the differential signal is outputted via the first bonding pad and outputted via the second bonding pad, the first driver and the second driver are disabled.

An output driving method according to the invention comprises the steps of:

a) transmitting and a first signal to a first bonding pad for output using a first driver;

b) transmitting and a second signal to a second bonding pad for output using a second driver; and c) converting a third signal into a differential signal using a third driver, and transmitting the differential signal to the first bonding pad and the second bonding pad for output.

Wherein, when the first signal is outputted via the first bonding pad and the second signal is outputted via the second bonding pad, the third driver is disabled. When the differential signal is outputted via the first bonding pad and the second bonding pad, the first driver and the second driver are disabled.

DETAILED DESCRIPTION OF THE PREFERRED EMBODIMENTS

To better understand the technical contents of the invention, detailed descriptions of preferred embodiments shall be given with the accompanying drawings below.

Figure 1:
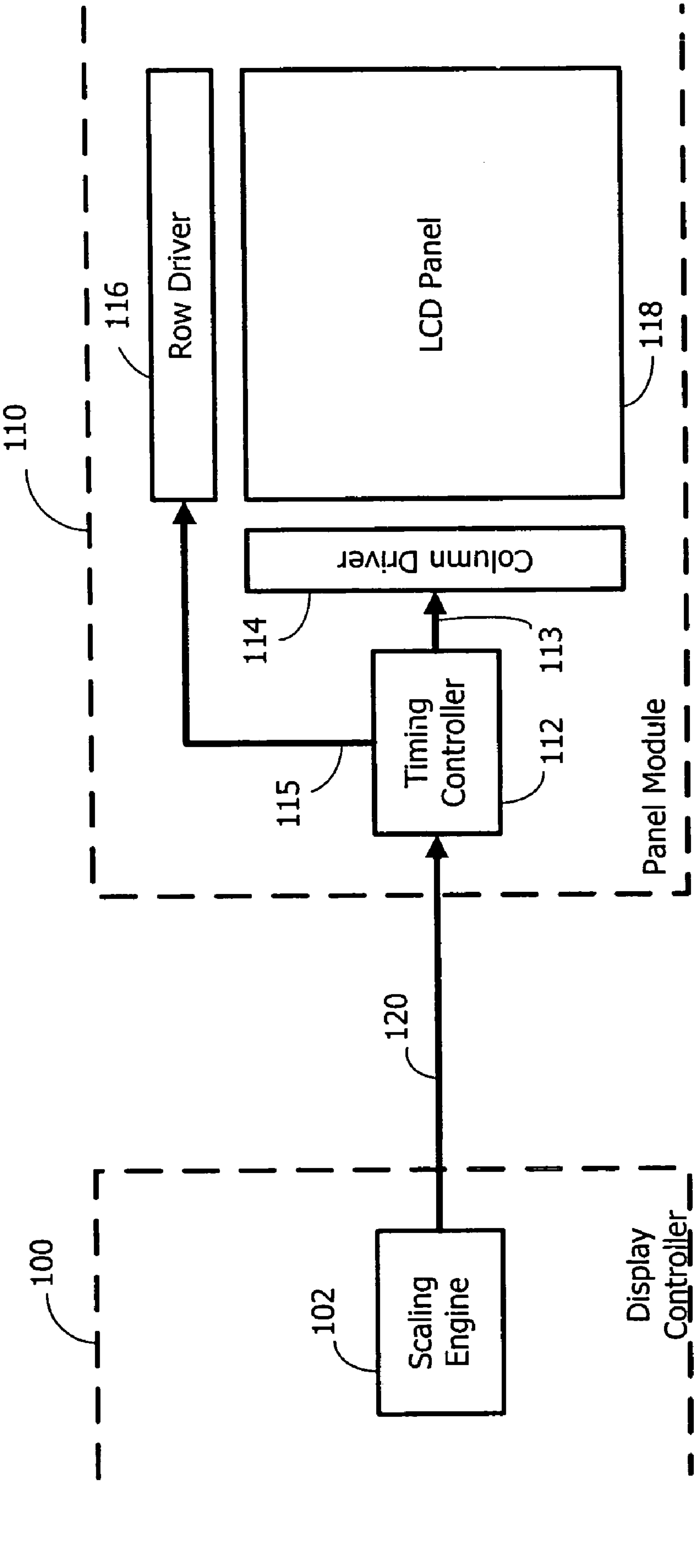
Figure 1 (Prior Art)
FIG. 1 shows a schematic block diagram illustrating an LCD display utilizing a TTL interface as a transmission interface between a panel module and a display controller.
Figure 2:
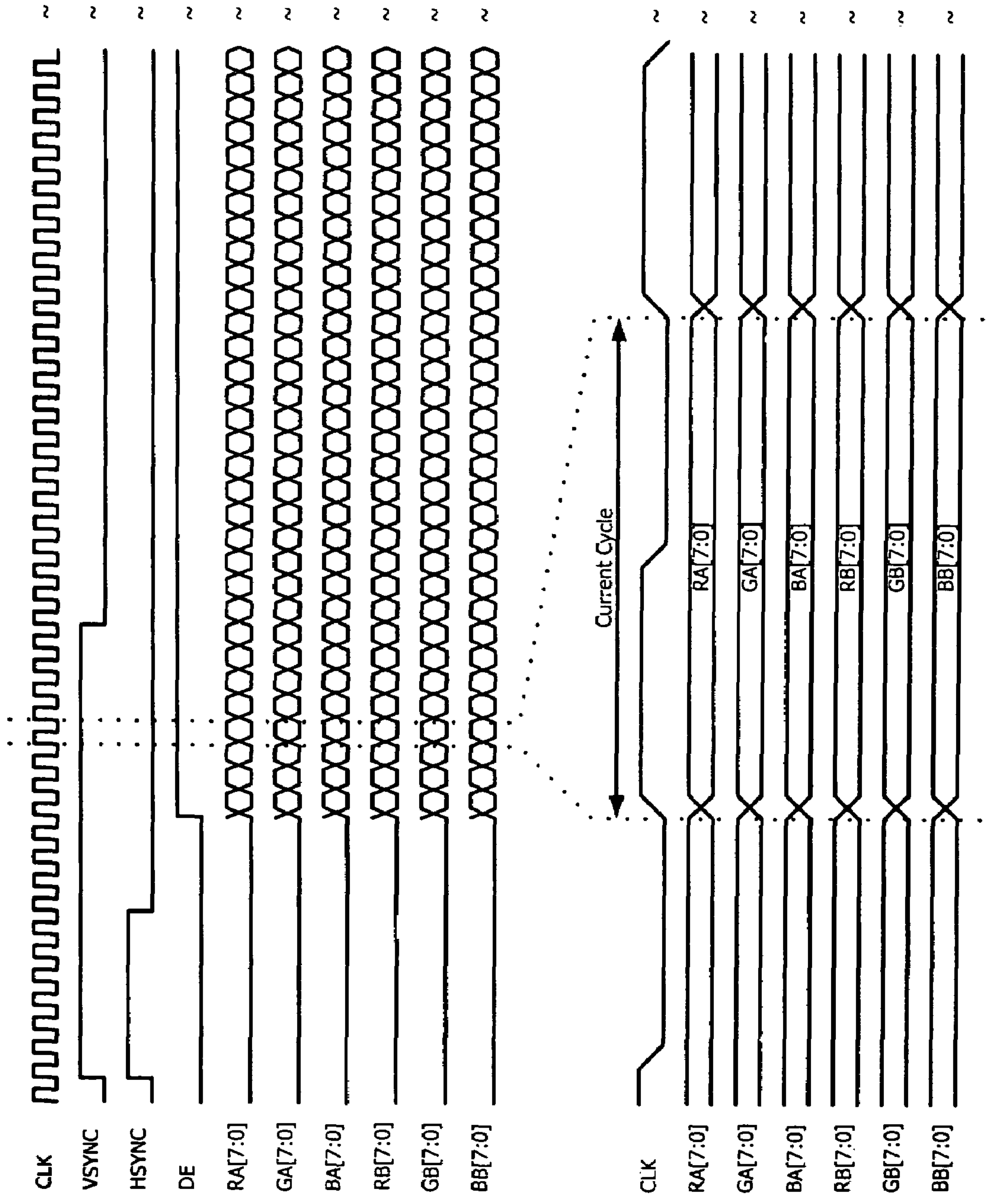
Figure 2 (Prior Art)
FIG. 2 shows a timing diagram of individual signals of the TTL interface 120 shown in FIG. 1.
Figure 3:
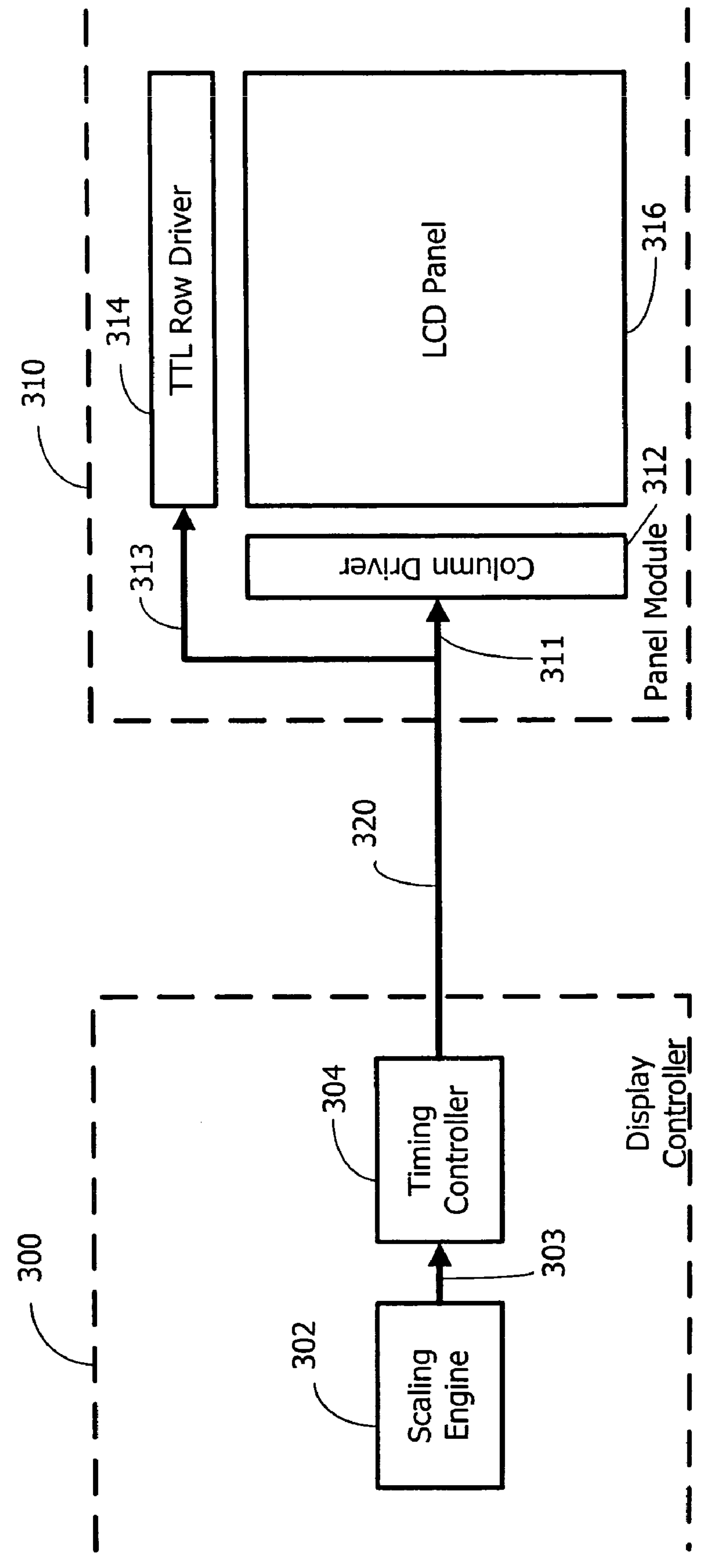
Figure 3 (Prior Art)
FIG. 3 shows a schematic block diagram illustrating an LCD display utilizing a TTL/TCON interface as a transmission interface between a panel module and a display controller.
Figure 4:
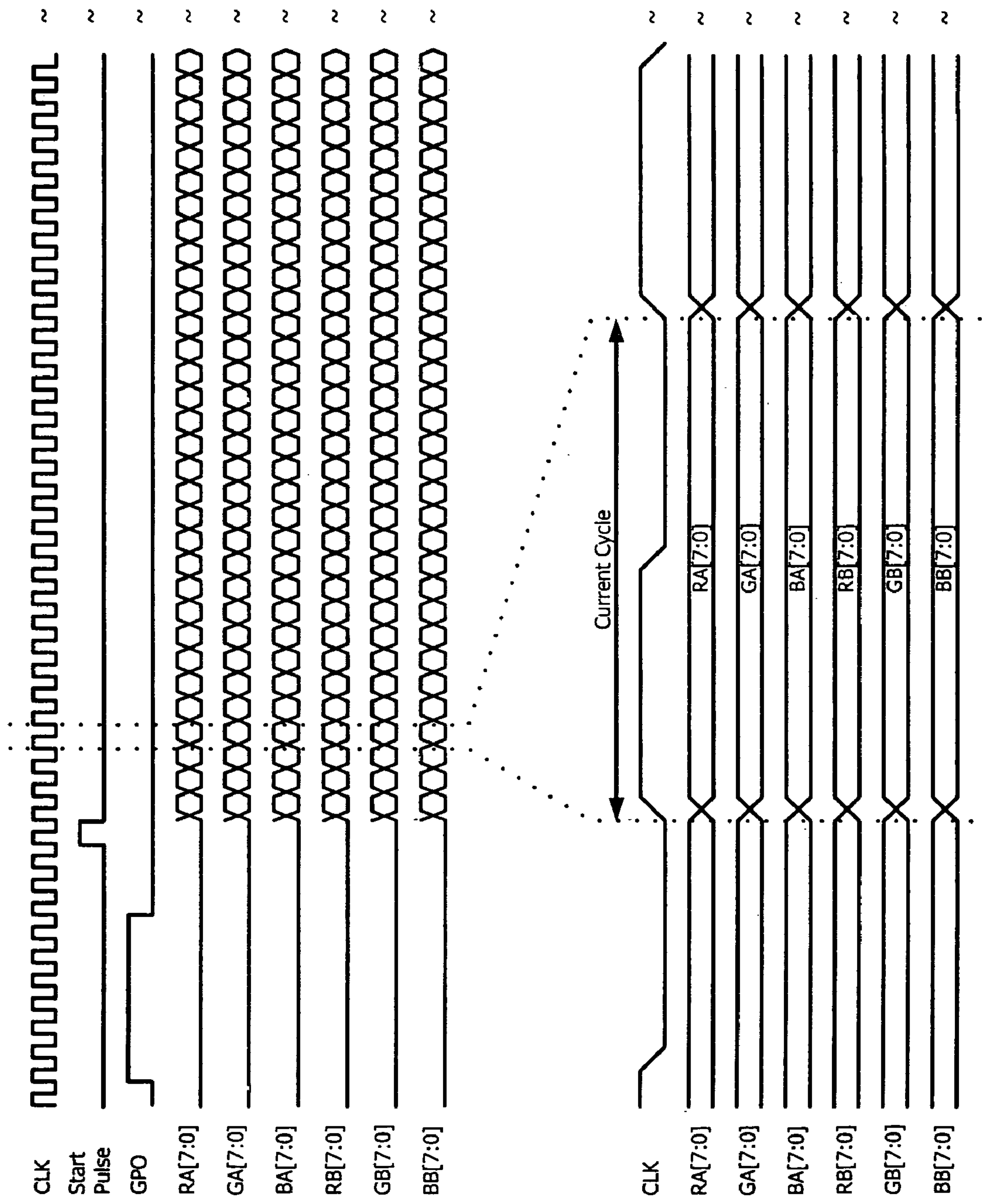
Figure 4 (Prior Art)
FIG. 4 shows a timing diagram of individual signals of the TTL/TCON interface 320 shown in FIG. 3.
Figure 5:
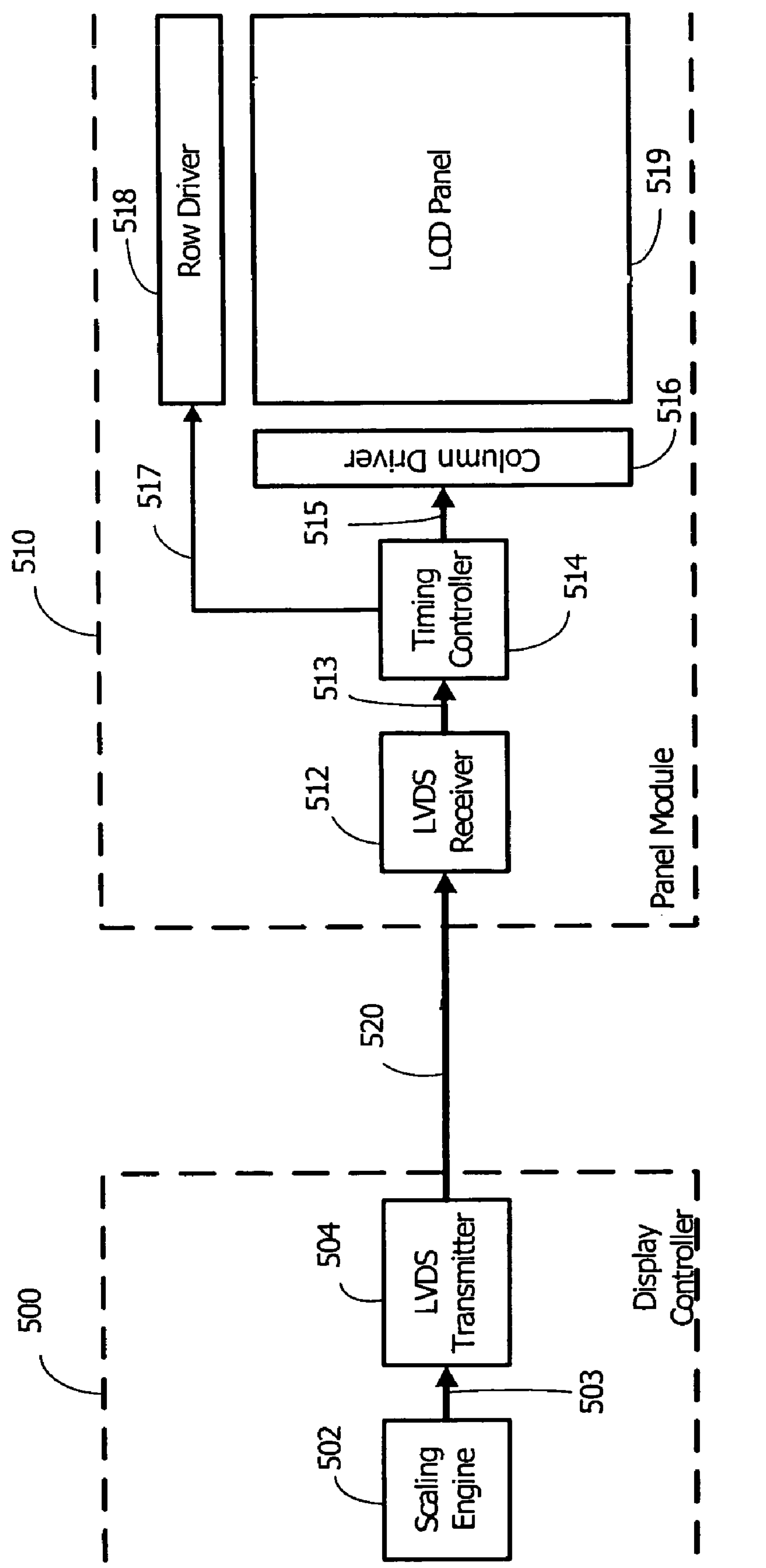
Figure 5 (Prior Art)
FIG. 5 shows a schematic block diagram illustrating an LCD display utilizing an LVDS interface as a transmission interface between a panel module and a display controller.
Figure 6:
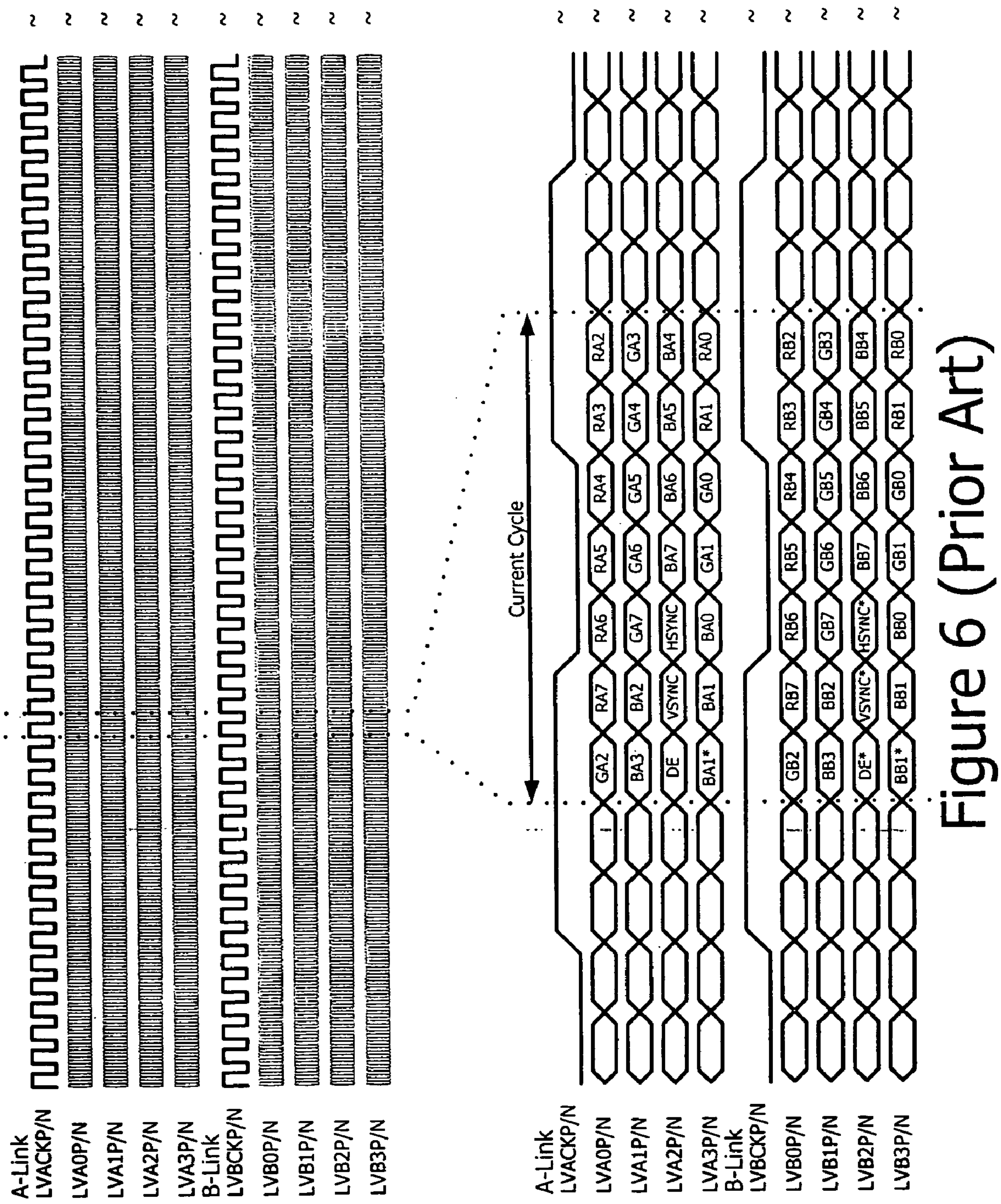
Figure 6 (Prior Art)
FIG. 6 shows a timing diagram of signals of the LVDS interface 520 shown in FIG. 5 in one format.
Figure 7:
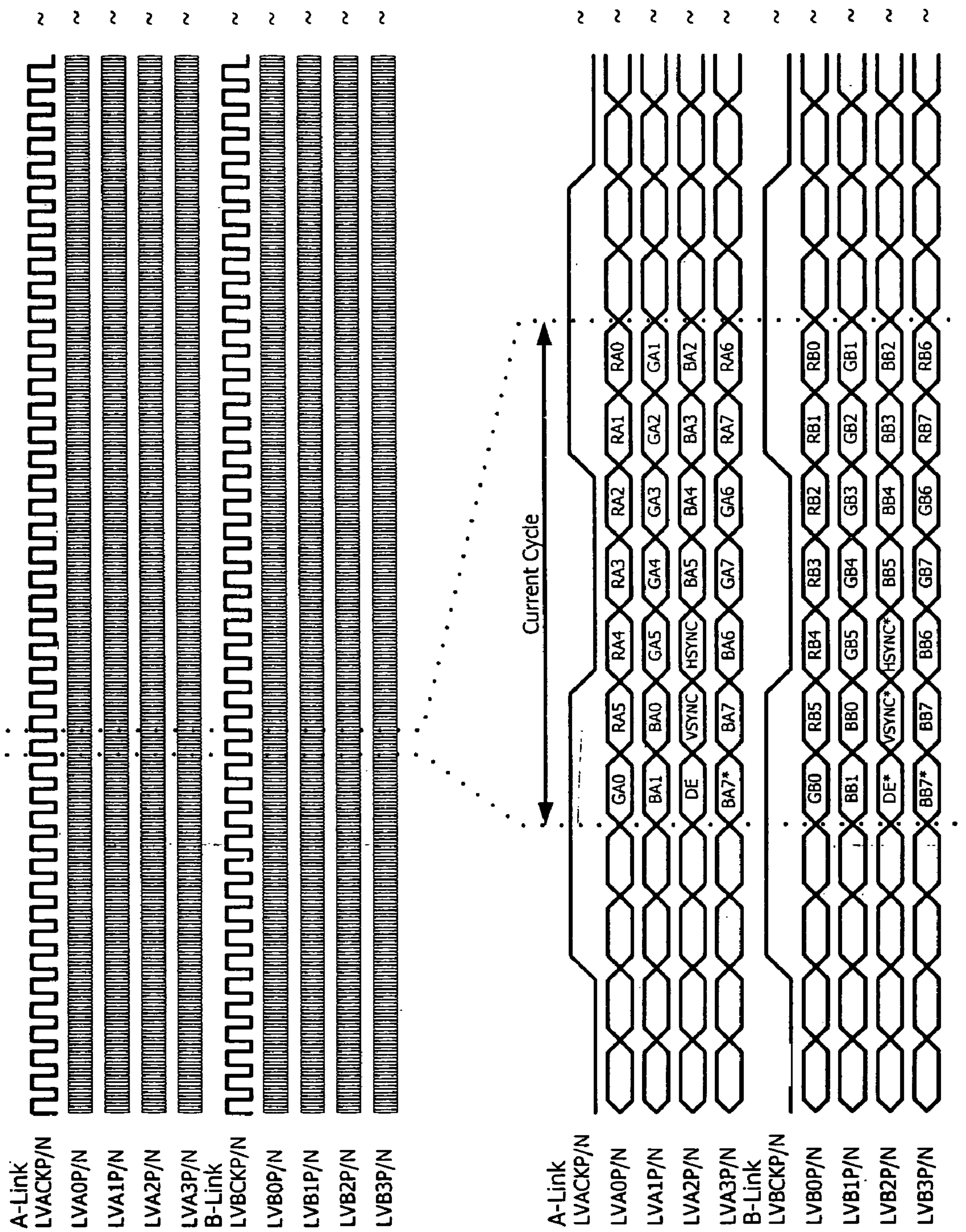
Figure 7 (Prior Art)
FIG. 7 shows a timing diagram of signals of the LVDS interface 520 shown in FIG. 5 in another format.
Figure 8:
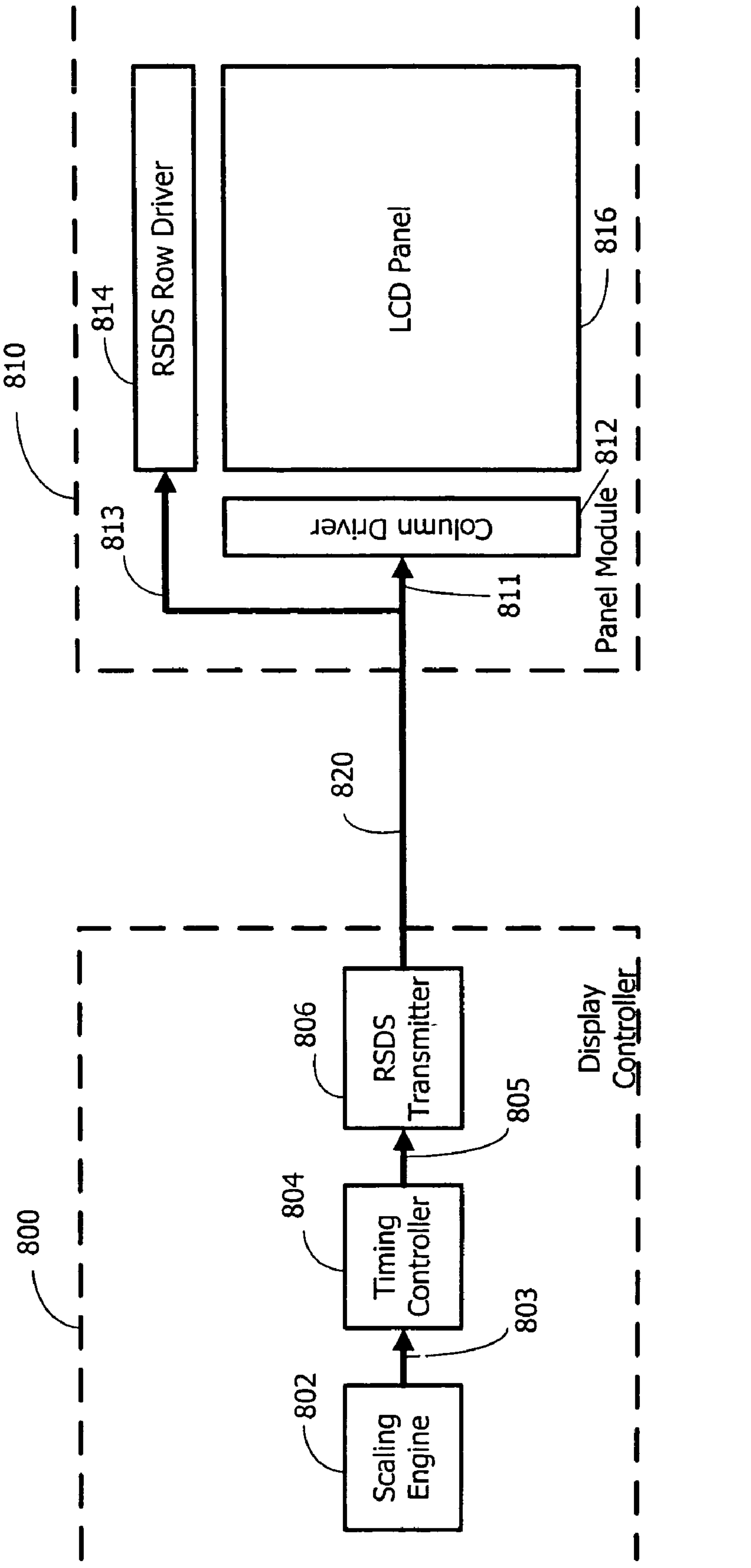
Figure 8 (Prior Art)
FIG. 8 shows a schematic block diagram illustrating an LCD display utilizing an RSDS/TCON interface as a transmission interface between a panel module and a display controller.
Figure 9:
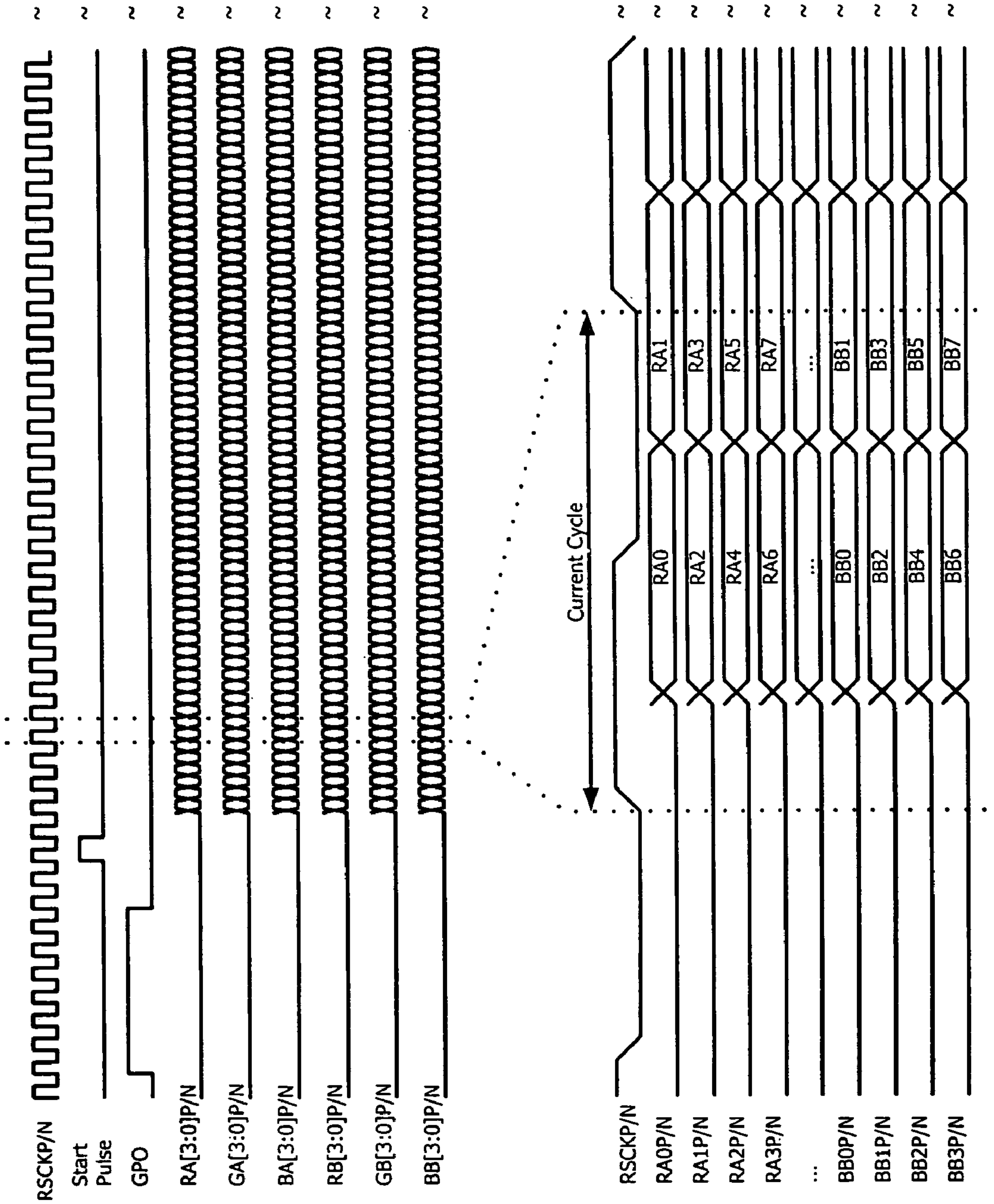
Figure 9 (Prior Art)
FIG. 9 shows a timing diagram illustrating the signals of the RSDS/TCON interface 820 shown in FIG. 8.
Figure 10:
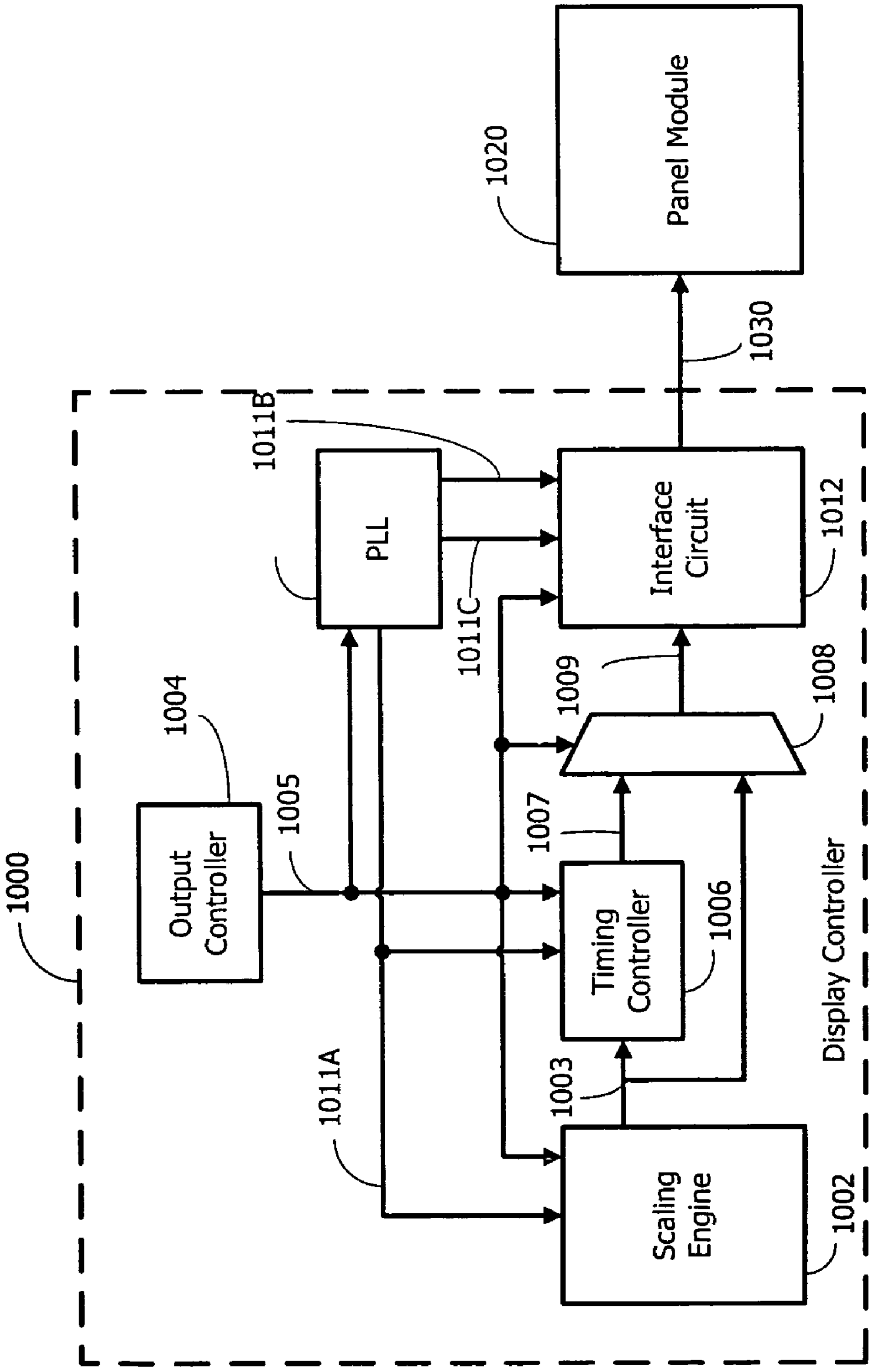
FIG. 10 shows a block schematic diagram of the display control device in a preferred embodiment according to the invention.

Referring to FIG. 10 showing a block schematic diagram of the display control device in a preferred embodiment according to the invention, a display control device 1000 according to the invention is connected to a panel module 1020 via an interface bus 1030. According to the invention, regardless of interface specifications including TTL, TTL/TCON, LVDS and RSDS/TCON required by the panel module 1020, the display control device 1000 is applicable. Referring to FIG. 10, the display control device 1000 according to the invention comprises a scaling engine 1002, an output controller 1004, a timing controller 1006, a selector 1008, a phase-locked loop 1010 and an interface circuit 1012.

Based upon interface specifications needed by the panel module 1020, the output controller 1004 produces a corresponding control signal 1005 for the scaling engine 1002, the timing controller 1006, the selector 1008, the phase-locked loop 1010 and the interface circuit 1012. Therefore, the control signal 1005 produced by the output controller 1004 may selectively exist in four interface modes namely TTL, TTL/TCON, LVDS and RSDS/TCON. According to the control signal 1005, the phase-locked loop 1010 produces a pixel clock 1011A for the scaling engine 1002 and the timing controller 1006, and an interface clock 1011B and a control signal 1101C for the interface circuit 1012. If the control signal 1005 represents a TTL mode or TTL/TCON mode, the interface clock 1011B and the pixel clock 1011A have an identical interface frequency. If the control signal 1005 represents an LVDS mode, the interface clock 1011B has a frequency seven times of that of the pixel clock 1011A. If the control signal 1005 represents an RSDS/TCON mode, the interface clock 1011B has a frequency twice that of the pixel clock 1011A.

According to the pixel clock 1011A, the scaling engine 1002 produces TTL signals 1003 for the timing controller 1006 and the selector 1008. The timing controller 1006 is for providing the selector 1008 with TTL/TCON signals 1007 that are converted from the TTL signals 1003. The selector 1008 receives the TTL signals 1003 and the TTL/TCON signals, and, according to selection made by the control signal 1005, outputs reference signals 1009 from the TTL signals 1003 and the TTL/TCON signals 1007. For instance, under a TTL mode or an LVDS mode, the TTL signals 1003 are selected by the selector 1008 and then outputted as the reference signals 1009; and under a TTL/TCON mode or an RSDS/TCON mode, the TTL/TCON signals 1007 are selected by the selector 1008 and then outputted as the reference signals 1009.

The interface circuit 1012 is for receiving the reference signals 1009, the control signal 1005, the interface clock 1011B and the control signal 1011C. Under a TTL mode, the reference signals 1009 are the TTL signals 1003, and the interface circuit 1012 outputs the TTL signals 1003 to the interface bus 1030. Under a TTL/TCON mode, the reference signals 1009 are the TTL/TCON signals 1007, and the interface circuit 1012 outputs the TTL/TCON signals 1007 to the interface bus 1030. Under an LVDS mode, the reference signals 1009 are the TTL signals 1003, and the interface circuit 1012 converts the TTL signals 1003 into LVDS signals further outputted to the interface bus 1030. Under an RSDS/TCON mode, the reference signals 1009 are the TTL/TCON signals 1007, and the interface circuit 1012 converts the TTL/TCON signals 1007 into RSDS/TCON signals further outputted to the interface bus 1030.

Figure 11:
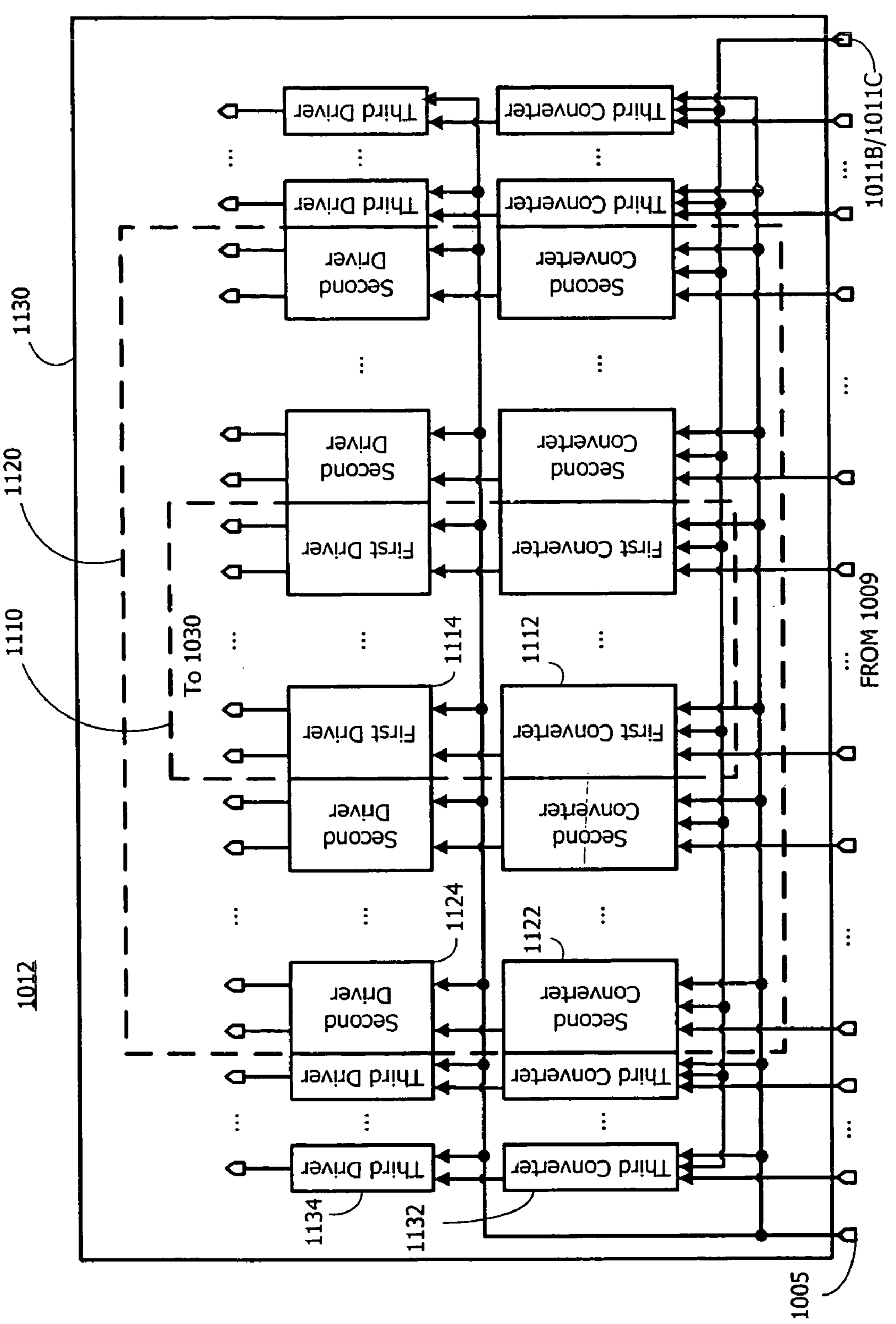
FIG. 11 shows a block schematic diagram illustrating the interface circuit 1012 in a preferred embodiment of the invention.

Referring to FIG. 11 showing a block schematic diagram illustrating the interface circuit 1012 in a preferred embodiment of the invention, the interface circuit 1012 according to the invention comprises a first interface unit 1110, a second interface unit 1120 and a third interface unit 1130. The first interface unit 1110 has a plurality of first converters 1112 and a plurality of first drivers 1114, wherein an output of each first converter 1112 corresponds with an input of each first driver 1114. The second interface unit 1120 has a plurality of second converters 1122 and a plurality of second drivers 1124, wherein an output of each second converter 1122 corresponds with an input of each second driver 1124. The third interface unit 1130 has a plurality of third converters 1132 and a plurality of third drivers 1134, wherein an output of each third converter 1132 corresponds with an input of each third driver 1134.

Figure 12:
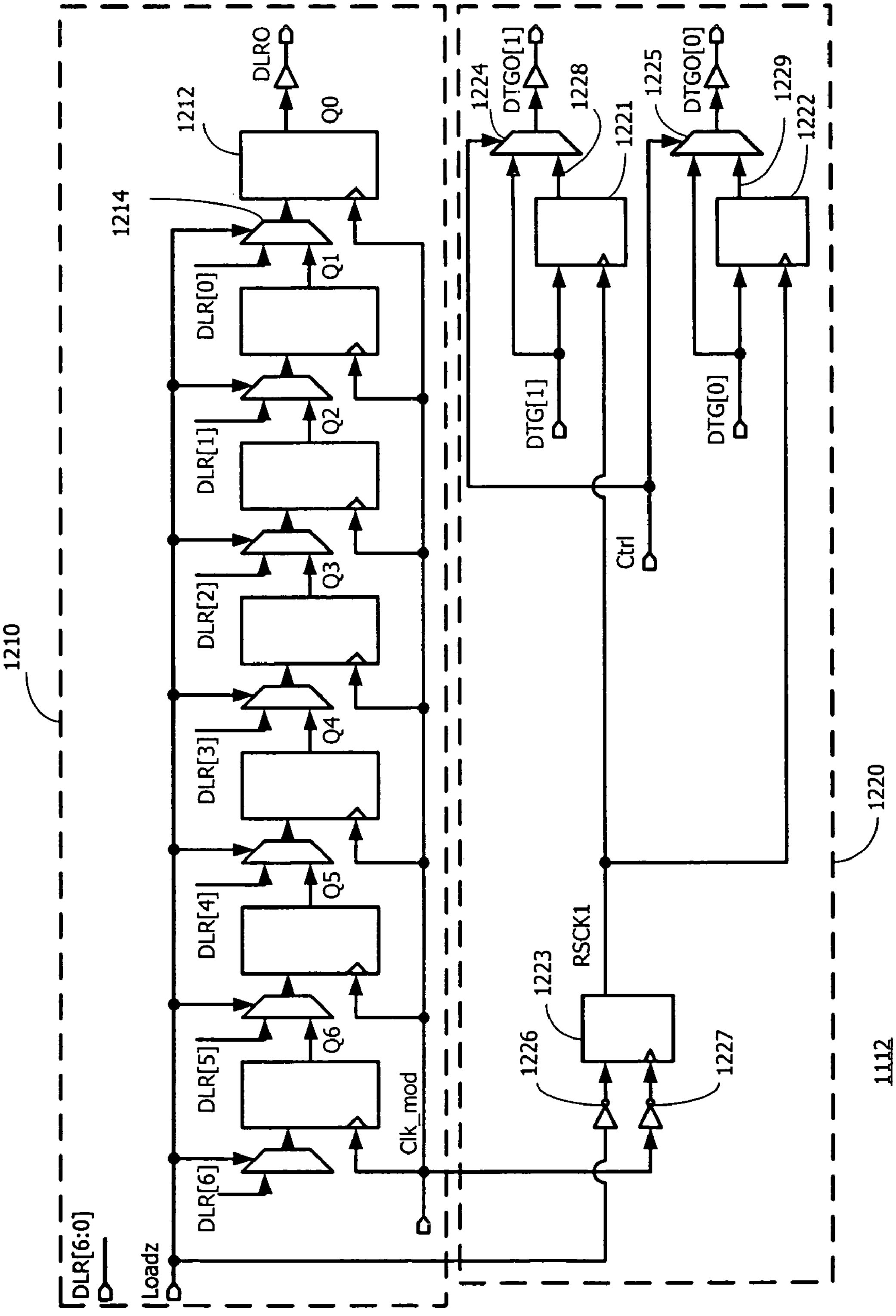
FIG. 12 shows a detailed circuit diagram of the first converter 1112 shown in FIG. 11.

Referring to FIG. 12 showing a detailed circuit diagram of the first converters 1112 shown in FIG. 11, each of the first converters 1112 consists of a first serializer 1210 and a selector 1220. The serializer 1210 has seven flip-flops 1212 connected in series. A clock input of each flip-flop 1212 is controlled by a timing signal Clk_mod indicated as the interface clock 1011B in FIG. 10. Each of serial input data DLR[6:0] is connected to an input of a multiplexer 1214 having the other end thereof connected to data outputs of the preceding flip-flops 1212. Loading of the serial data DLR[6:0] is controlled by a signal Loadz, which comes from the control signal 1011C in FIG. 10. Therefore, according to controls of the timing signal Clk_mod, the serial converter 1210 outputs the seven bit data DLR[6:0] including DLR[0], DLR[1], DLR[2], DLR[3], DLR[4], DLR[5] and DLR[6] in sequence to an output DLRO of the serializer 1210.

The selector 1220 has three flip-flops 1221, 1222 and 1223, two multiplexers 1224 and 1225, and two inverters 1226 and 1227. After having been processed by inverter 1226, the load signal Loadz is connected to a data input of the flip-flop 1223. After having been processed by the inverter 1227, the clock signal Clk_mod is connected to a clock input of the flip-flop 1223. An input datum DTG[1] is simultaneously connected to a data input of the flip-flop 1221 and an input of the multiplexer 1224, and a data output 1228 of the flip-flop 1221 is connected to the other input of the multiplexer 1224. An input datum DTG[0] is simultaneously connected to a data input of the flip-flop 1222 and an input of the multiplexer 1225, and a data output 1229 of the flip-flop 1222 is connected to the other input of the multiplexer 1225. Control ends of the multiplexer 1224 and 1225 are both connected to a signal Ctrl, which comes from the control signal 1005 in FIG. 10. Clock inputs of the flip-flops 1221 and 1222 are connected to a data output of the flip-flop 1223, a signal RSCK1. The data outputs of the multiplexers 1224 and 1225 are outputs DTGO[1] and DTGO[0] of the selector 1220.

Under a TTL or TTL/TCON mode, the signal Ctrl controls the multiplexers 1224 and 1225, and directly sends DTG[1] and DTG[0] to the selector outputs DTGO[1] and DTGO[0].

Figure 13:
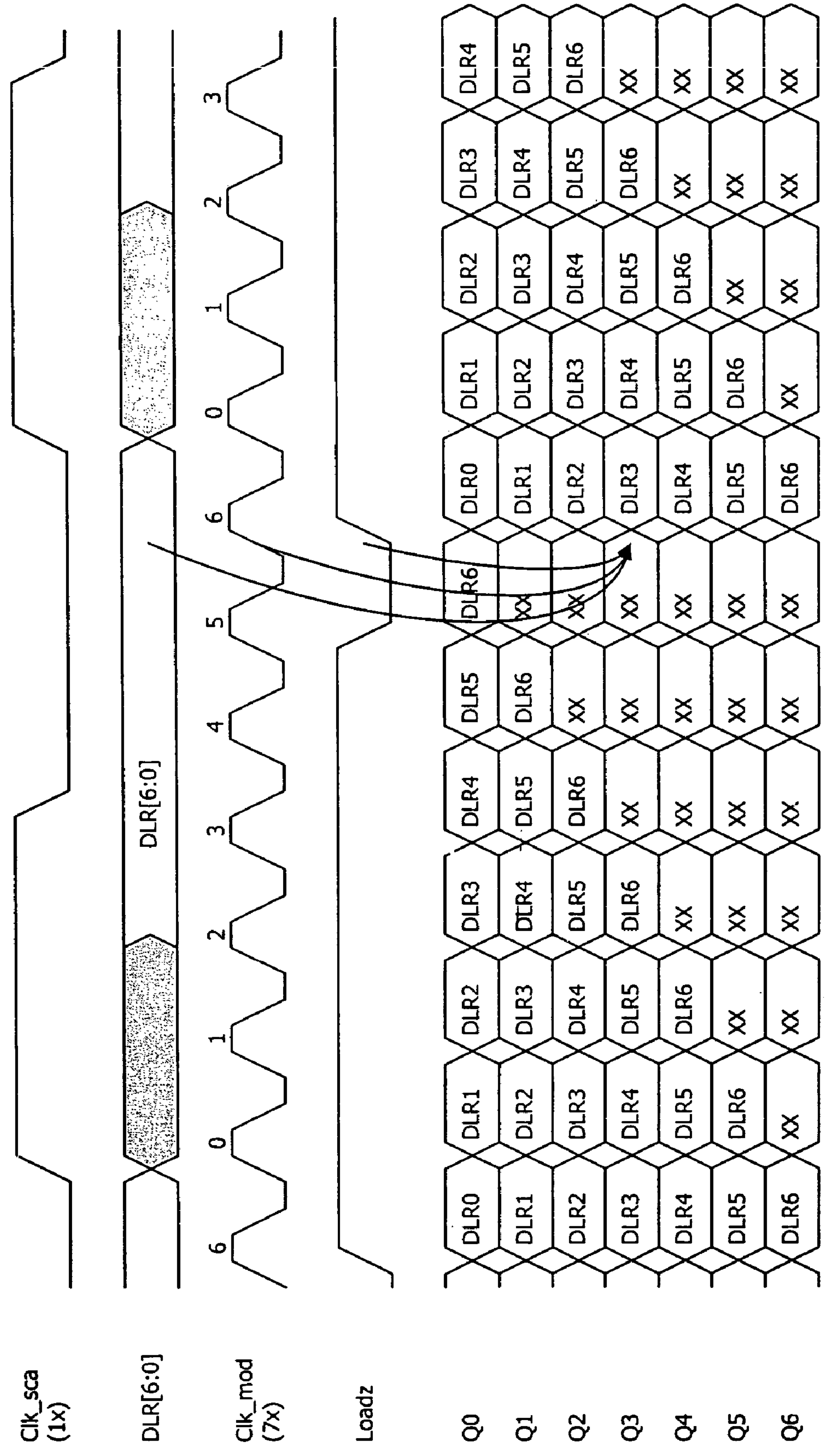
FIG. 13 shows a timing diagram of individual signals of the first converter 1112 under an LVDS mode shown in FIG. 12.

Under an LVDS mode, the clock signal Clk_mod has a frequency seven times of a timing frequency Clk_sca, which is the interface clock 1011A in FIG. 10. Thus, the serializer 1210 serves as a 7:1 serializer, and, according to controls of the clock signal Clk_mod, outputs the parallel input signals DLR[6:0] in sequence to the output DLRO of the serializer 1210, with a timing diagram of the signals indicated as in FIG. 13.

Figure 14:
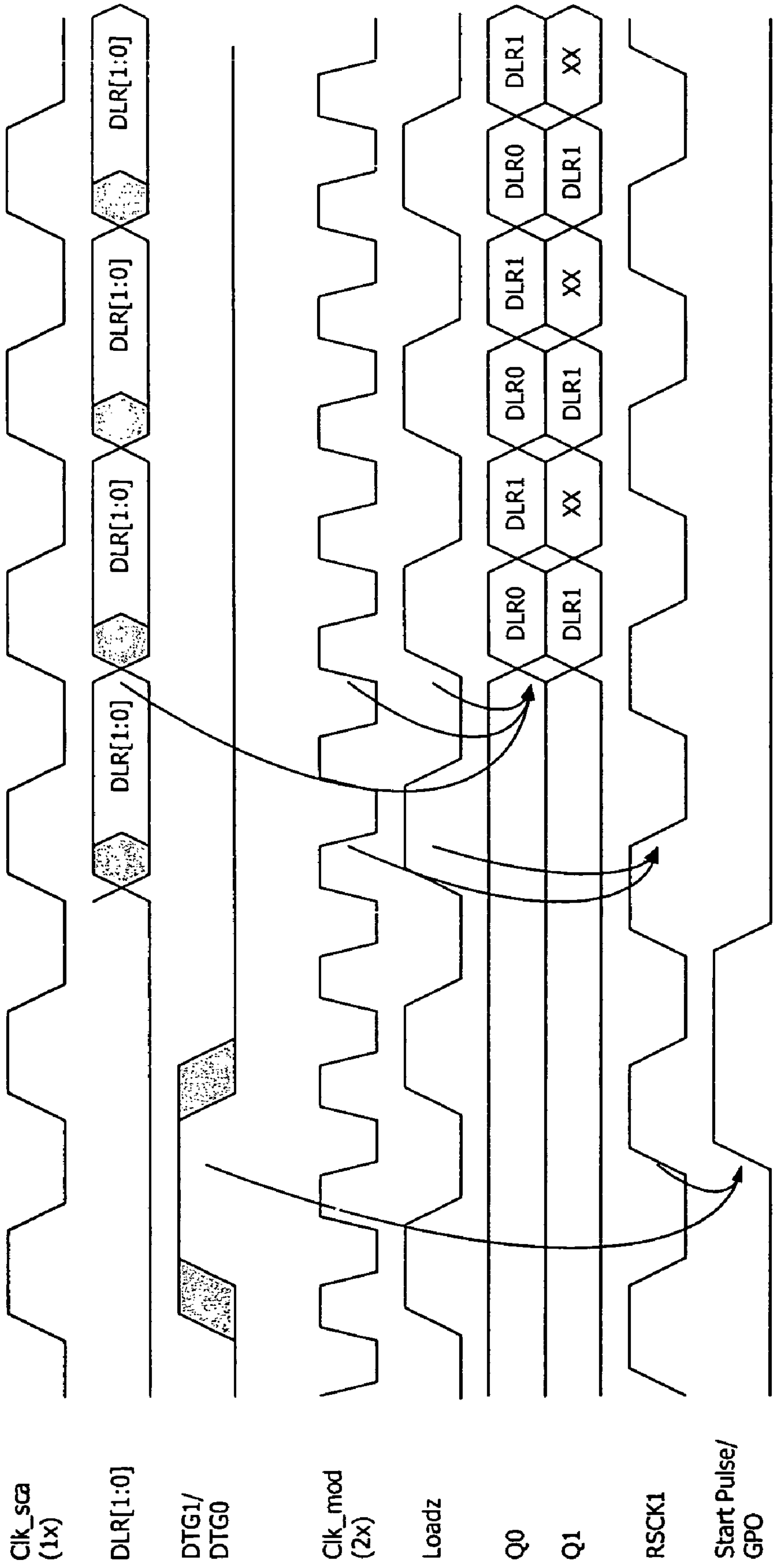
FIG. 14 shows a timing diagram of individual signals of the first converter 1112 under an RSDS/TCON mode shown in FIG. 12.

Under an RSDS/TCON mode, the clock signal Clk_mod has a frequency twice the timing frequency Clk_sca, wherein only DLR[1:0] are effective bits. Thus, the serializer 1210 serves as a 2:1 serializer, and, according to controls of the clock signal Clk_mod, outputs the parallel input signals DLR [1:0] in sequence to the output DLRO of the serializer 1210. Furthermore, under an RSDS/TCON mode, in order to select certain first converters 1112 as start pulse signals or GPO signals, the multiplexer 1224 chooses the output 1228 of the flip-flop 1221 as DTGO[1], and the multiplexer 1225 chooses the output 1229 of the flip-flop 1222 as DTGO[0], with a timing diagram of individual signals indicated as in FIG. 14.

Figure 15:
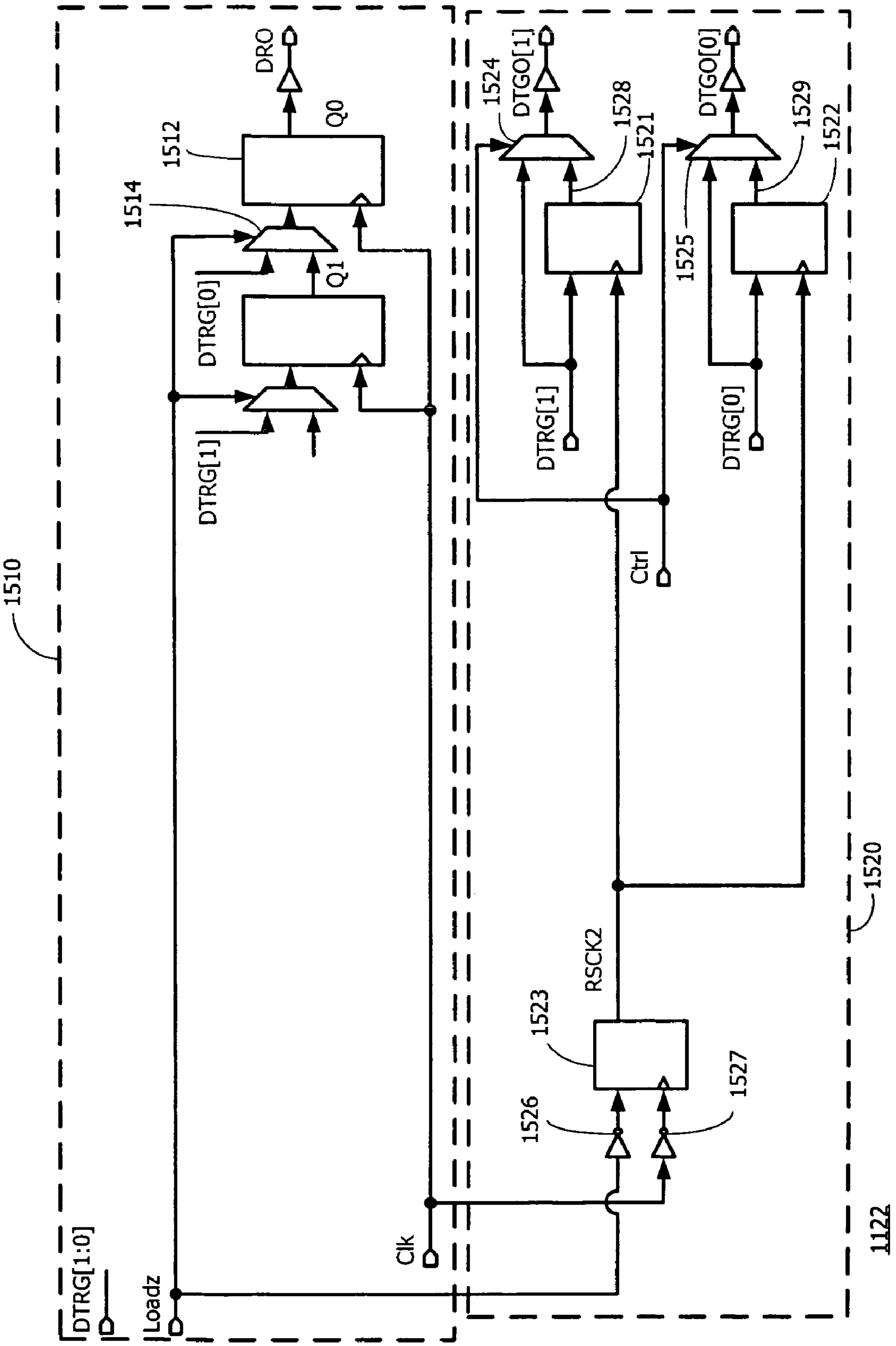
FIG. 15 shows a detailed circuit diagram of the second converters 1122 shown in FIG. 11.

Referring to FIG. 15 showing a detailed circuit diagram of the second converters 1112 in FIG. 11, each of the second converters 1122 consists of a serializer 1510 and a selector 1520. The serializer 1510 has two flip-flops 1512 connected in series. A clock input of each flip-flop 1512 is controlled by a timing signal Clk_mod, which is the interface clock 1011B in FIG. 10. The parallel input data DTRG[1:0] are connected to an input of a multiplexer 1514 having the other end thereof connected to data outputs of the preceding flip-flops 1512. Loading of the parallel data DLR[1:0] is controlled by the signal Loadz, which comes from the control signal 1011C in FIG. 10. Therefore, according to controls of the timing signal Clk_mod, the serial converter 1510 outputs the two bit data DLR[1:0] including DLR[0] and DLR[1] in sequence to an output DRO of the serializer 1510.

The selector 1520 has three flip-flops 1521, 1522 and 1523, two multiplexers 1524 and 1525, and two inverters 1526 and 1527. After having been processed by inverter 1526, a load signal Loadz is connected to a data input of the flip-flop 1523. After having been processed by the inverter 1527, the Clk_ mod is connected to a clock input of the flip-flop 1523. An input datum DTRG[1] is simultaneously connected to a data input of the flip-flop 1521 and an input of the multiplexer 1524, and a data output 1528 of the flip-flop 1521 is connected to the other input of the multiplexer 1524. An input datum DTRG[0] is simultaneously connected to a data input of the flip-flop 1522 and an input of the multiplexer 1525, and a data output 1529 of the flip-flop 1522 is connected to the other input of the multiplexer 1525. Control ends of the multiplexers 1524 and 1525 are both connected to a signal Ctrl, which comes from the control signal 1005 in FIG. 10. Clock inputs of the multiplexers 1521 and 1522 are connected to a data output of the flip-flop 1523, a signal RSCK2. The data outputs of the multiplexers 1224 and 1225 are outputs DTGO [1] and DTGO[0] of the selector 1520.

Under a TTL or TTL/TCON mode, the signal Ctrl controls the multiplexers 1524 and 1525, and directly sends DTRG[1] and DTRG[0] to the selector outputs DTGO[1] and DTGO [0], respectively.

Figure 16:
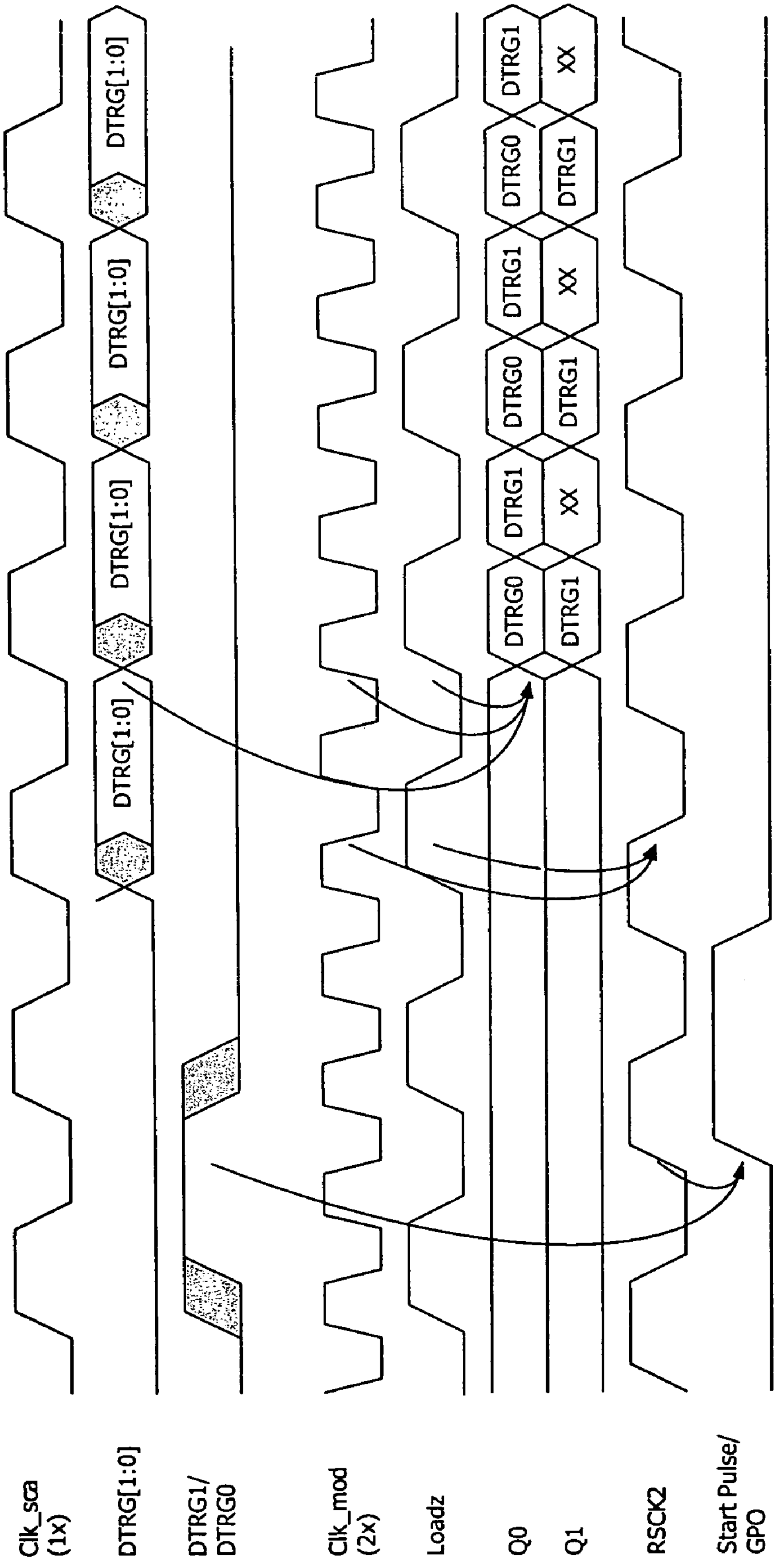
FIG. 16 shows a timing diagram of individual signals of the second converters 1122 under an RSDS/TCON mode shown in FIG. 15.

Under an RSDS/TCON mode, the clock signal Clk-mod has a frequency twice the timing frequency Clk_sca, wherein the timing frequency Clk_sca is the timing clock 1102A shown in FIG. 10. Thus, the serializer 1210 serves as a 2:1 serializer, and, according to controls of the clock signal $Clk_{13}$ mod, outputs the parallel input signals DTRG[1:0] in sequence to the output DRO of the serializer 1510. Furthermore, under an RSDS/TCON mode, in order to select certain second converters 1122 as start pulse signals or GPO signals, the multiplexer 1524 chooses the output 1528 of the flip-flop 1521 as DTGO[1], and the multiplexer 1525 chooses the output 1529 of the flip-flop 1522 as DTGO[0], with a timing diagram of individual signals indicated as in FIG. 16.

Figure 17:
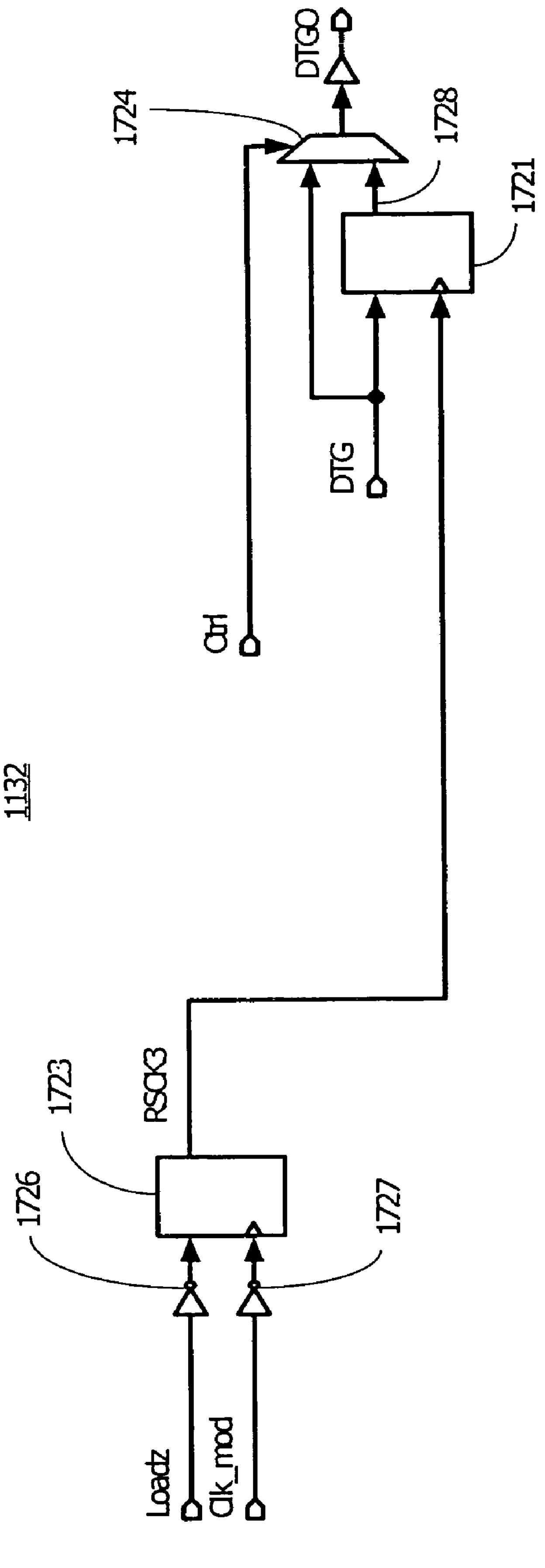
FIG. 17 shows a detailed circuit diagram of the third converters 1132 shown in FIG. 11.

Referring to FIG. 17 showing a detailed circuit diagram of the third converters 1132 in FIG. 11, each of the third converters 1132 consists of two flip-flops 1721 and 1723, a multiplexer 1724 and two inverters 1726 and 1727. After having been processed by inverter 1726, a load signal Loadz is connected to a data input of the flip-flop 1723, wherein the signal Loadz is from the control signal 1011C in FIG. 10. After having been processed by the inverter 1727, the Clk_mod is connected to a clock input of the flip-flop 1723, wherein the clock signal is the interface clock 1011B in FIG. 10. An input datum DTG is simultaneously connected to a data input of the flip-flop 1721 and an input of the multiplexer 1724, and a data output 1728 of the flip-flop 1721 is connected to the other input of the multiplexer 1724. A control end of the multiplexer 1724 is connected to a signal Ctrl, which comes from the control signal 1005 in FIG. 10. A clock input of the multiplexer 1723 is connected to a data output of the multiplexer 1723, a control signal RSCK3. The data output of the multiplexer 1724 is an output DTGO of the third converter 1132.

Under a TTL or TTL/TCON mode, the signal Ctrl controls the multiplexer 1724, and directly sends DTG to the selector output DTGO.

Under an RSDS/TCON mode, to select certain third converters 1132 as start pulse signals or GPO signal outputs, the multiplexer 1724 chooses the output 1728 of the flip-flop 1724 as DTGO.

Figure 18:
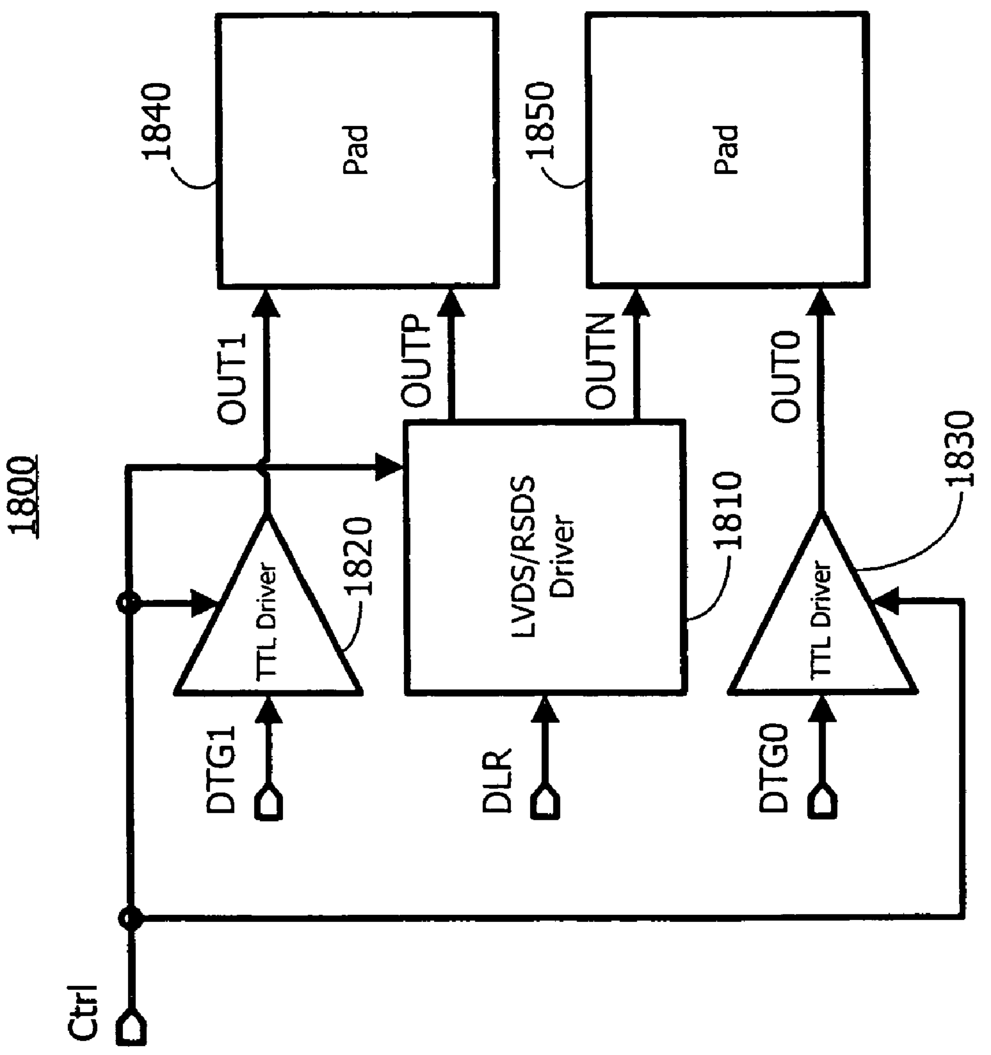
FIG. 18 shows a block diagram of the output driving device 1800 according to the invention.

Referring to FIG. 18 showing a block diagram of an output driving device 1800 according to the invention, the output driving device 1800 may be the first driver 1114 or the second driver 1124 in FIG. 11. Referring to FIG. 18, the output driving device 1800 includes an LVDS/RSDS driver 1810, two TTL drivers 1820 and 1830, which are all controlled by the control signal Ctrl. When the output driving device 1800 serves as the first driver 1114, an input DLR of the LVDS/RSDS driver 1810 is connected to the output DLRO of the first converter 1112. When the output driving device 1800 serves as the second driver 1124, the input DLR of the LVDS/RSDS driver 1810 is connected to the output DRO of the second converter 1122. When the output driving device 1800 serves as the first driver 1114, an input DTG1 of the TTL driver 1820 is connected to the output DTGO[1] of the first converter 1112, and an input DTGO of the TTL driver 1830 is connected to the output DTGO[0] of the first converter 1112. When the output driving device 1800 serves as the second driver 1124, the input DTG1 of the TTL driver 1820 is connected to the output DTGO[1] of the second converter 1122, and the input DTGO of the TTL driver 1830 is connected to the output end DTGO[0] of the second converter 1122.

When the output driving device 1800 is for outputting TTL signals, start pulse signals or GPO signals, the signal Ctrl disables the LVDS/RSDS driver 1810 and enables the TTL drivers 1820 and 1830. Hence, TTL signals at the inputs DTG1 and DTGO of the TTL drivers 1820 and 1830 are transmitted to bonding pads 1840 and 1850 via outputs OUT1 and OUT0, respectively. When the output driving device 1800 outputs LVDS or RSDS differential signals, the signal Ctrl disables the TTL drivers 1820 and 1830, and enables the LVDS/RSDS driver 1810. Hence, signals at the input DLR of the LVDS/RSDS driver 1810 are converted into differential signals further transmitted to the bonding pads 1840 and 1850 from outputs OUTP and OUTN.

Figure 19:
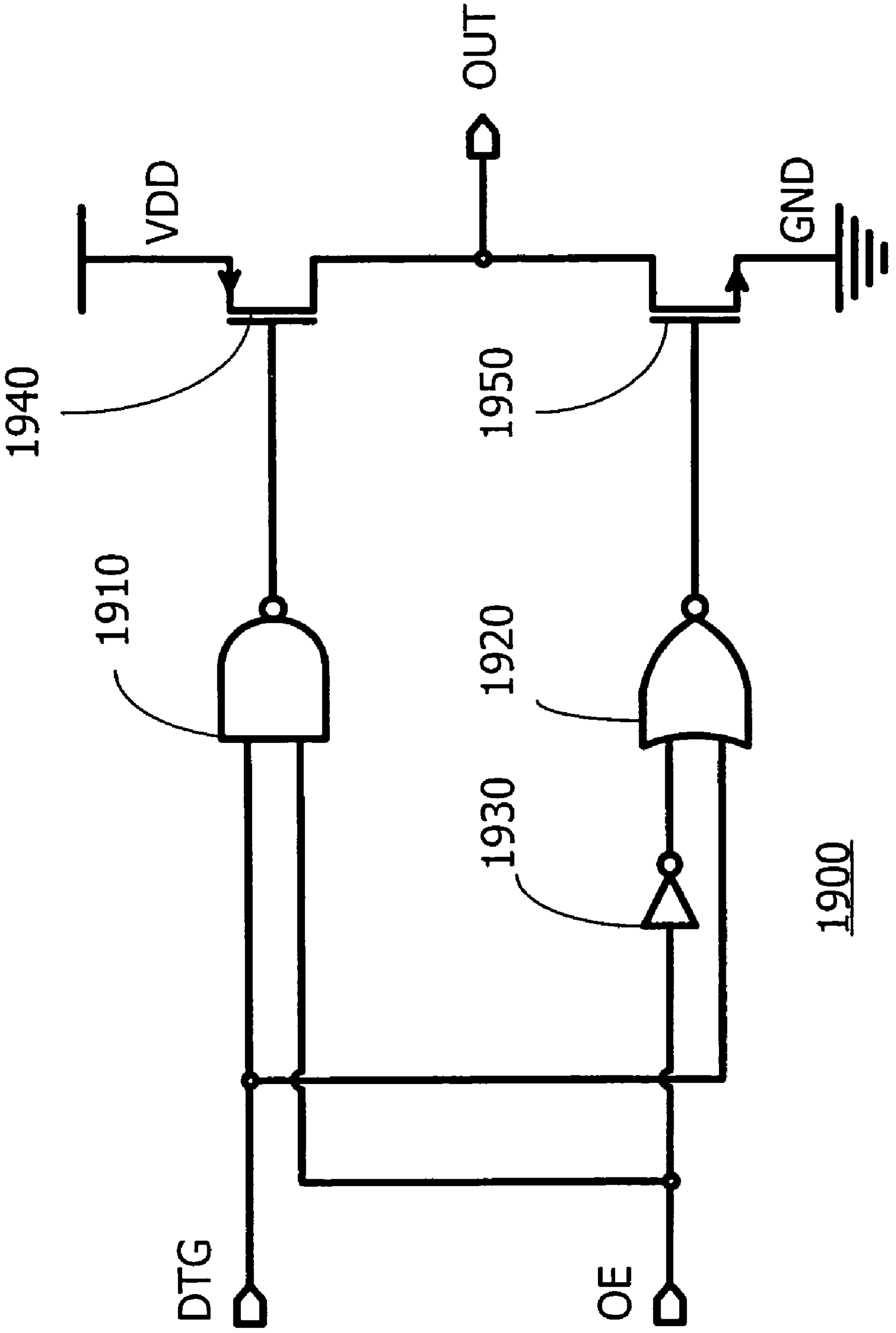
FIG. 19 shows a detailed circuit diagram of a TTL driver 1900.

Referring to FIG. 19 showing a detailed circuit diagram a TTL driver 1900, the TTL driver 1900 may be the TTL driver 1820 or 1830 in FIG. 18, or the third driver 1134 in FIG. 11. Referring to FIG. 19, the TTL driver 1900 includes an NAND gate 1910, a NOR gate 1920, an inverter 1930, a PMOS transistor 1940 and an NMOS transistor 1950. The NAND gate is connected to DTG and OE signals using two inputs, and the NOR gate 1920 is connected to the signal DTG and an inverted OE signal. The OE signal comes from the control signal Ctrl. Outputs of the NAND gate 1910 and the NOR gate 1920 are for controlling gates of the PMOS transistor 1940 and the NMOS transistor 1950, respectively. Sources of the PMOS transistor 1940 and the NMOS transistor 1950 are connected to VDD and GND, respectively. Drains of the PMOS transistor 1940 and the NMOS 1950 are connected to be an output OUT.

When the OE signal is "0", the output OUT is at high impedance. When the OE signal is "1" and the DTG signal is "1", the output OUT is at logic high. When the OE signal is "1" and the DTG signal is "0", the output OUT is at logic low.

Figure 20:
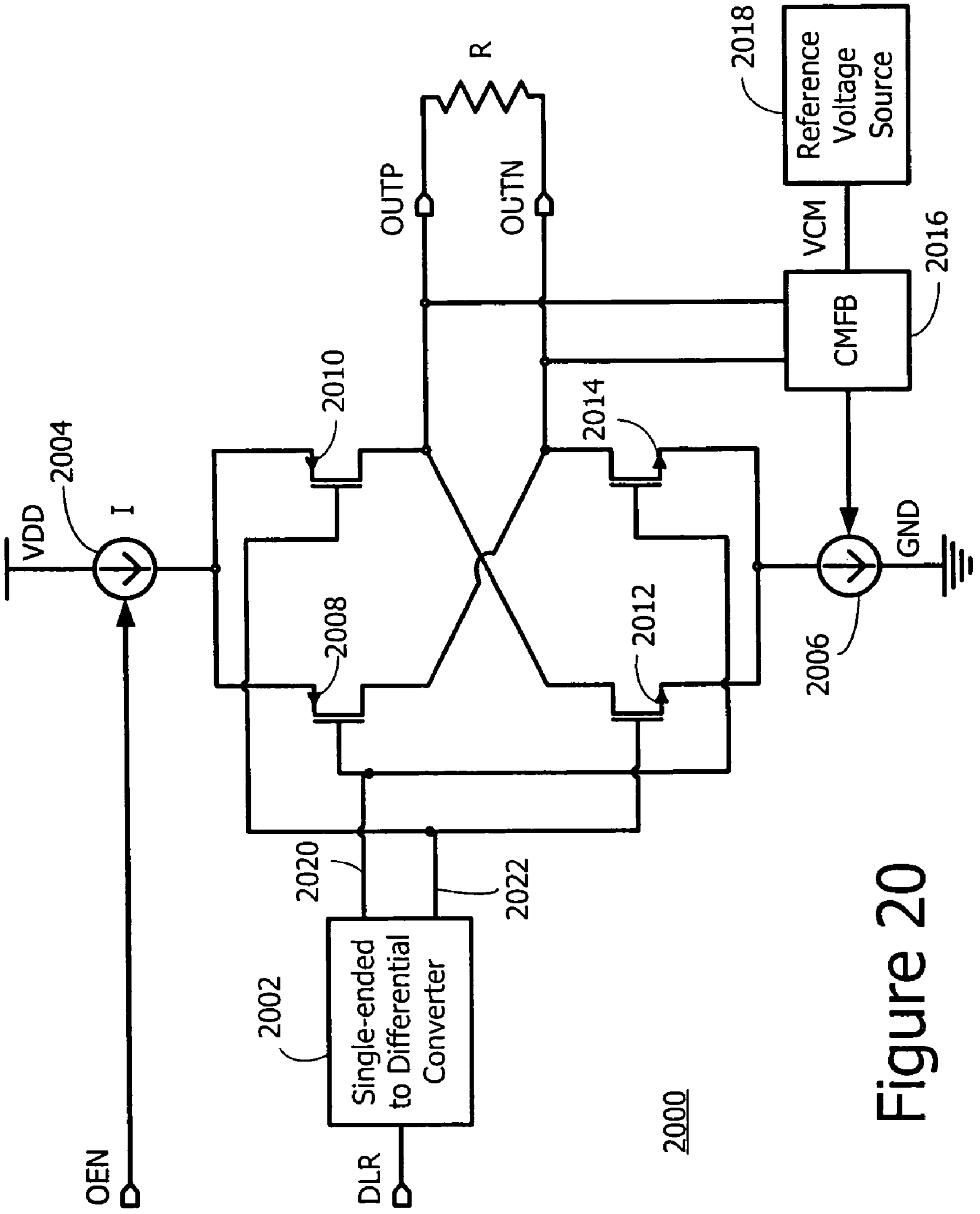
FIG. 20 shows a detailed circuit diagram of an LVDS/RSDS driver 2000.

Referring to FIG. 20 showing a detailed circuit diagram of an LVDS/RSDS driver 2000, the LVDS/RSDS driver 2000 may be the LVDS/RSDS driver 1810 shown in FIG. 18. Referring to FIG. 20, the LVDS/RSDS driver 2000 has a single-ended to differential converter 2002, two current sources 2004 and 2006, two PMOS transistors 2008 and 2010, two NMOS transistors 2012 and 2014, a common mode feedback controller 2016 and a reference voltage source 2018. The current source 2004 is controlled by a signal OEN, which comes from the control signal Ctrl. The single-end to differential converter 2002 has an input DLR and two outputs 2020 and 2022. The output 2020 of the converter 2002 is connected to gates of the PMOS transistor 2008 and the NMOS transistor 2014, and the output end 2022 of the converter 2002 is connected to gates of the PMOS transistor 2010 and the NMOS transistor 2012. A drain of the PMOS transistor 2008 and a drain of the NMOS transistor 2014 are connected to be an output OUTN, and a drain of the PMOS transistor 2010 and a drain of the NMOS transistor 2012 are connected to be an output OUTP. Between the outputs OUTP and OUTN is an externally connected resistor R.

A source of the PMOS transistor 2008 is connected to a source of the NMOS transistor 2010, and the current source 2004 is connected between VDD and the source of the PMOS transistor 2008. A source of the NMOS transistor 2012 is connected to a source of the NMOS transistor 2014, and the current source 2006 is connected between GND and the source of the NMOS transistor 2012. The reference voltage source 2018 is for providing a common mode voltage VCM with the common mode feedback controller 2016. The common mode feedback controller 2016 is for monitoring common mode voltages of the outputs OUTP and OUTN, and adjusting current values of the current source 2006 according to the reference voltage VCM.

When an OEN signal is "1", the current I of the current source 2004 is 0, and therefore the outputs OUTP and OUTN are at high impedance. When the OEN signal is "0" and the signal DLR is "1", the outputs 2020 and 2022 of the single-ended to differential converter 2002 are "1" and "0", respectively. The PMOS transistor 2010 and the NMOS transistor 2014 are switched on, and the PMOS transistor 2008 and the NMOS transistor 2012 are switched off. A voltage difference of the output OUTP relative to the output OUTN is I×R. When the OEN signal is "0" and the DLR signal is "0", the output ends OUTP and OUTN of the single-ended to differential converter 2002 are "0" and "1", respectively. The PMOS transistor 2008 and the NMOS transistor 2012 are switched on, and the PMOS transistor 2010 and the NMOS transistor 2014 are switched off. A voltage difference of the output OUTN relative to the output end OUTP is I×R.

It is of course to be understood that the embodiments described herein are merely illustrative of the principles of the invention but not to limit the invention within. Without departing from the spirit and scope of the invention as set forth in the following claims, a wide variety of modifications thereto may be effected by persons skilled in the art.

What is claimed is:

1. An output driving device comprising:

a first bonding pad and a second bonding pad;

a first driver for transmitting a first image signal to said first bonding pad for output;

a second driver for transmitting a second image signal to said second bonding pad for output; and a third driver for converting a third image signal into a differential signal transmitted to said first bonding pad and said second bonding pad for output, wherein said differential image signal is one of an LVDS signal and an RSDS signal;

wherein, when said first image signal is outputted via said first bonding pad and said second image signal is outputted via said second bonding pad, said third driver is disabled; and when said differential signal is outputted via said first bonding pad and said second bonding pad, said first driver and said second driver are disabled.

2. The output driving device as claimed in claim 1, wherein said first image signal and said second image signal are TTL (Transistor-Transistor Level) signals.

3. The output driving device as claimed in claim 2, wherein said first driver and said second driver are TTL (Transistor-Transistor Level) drivers.

4. An output driving method comprising the steps of:

transmitting a first image signal to a first bonding pad for output using a first driver;

transmitting a second image signal to a second bonding pad for output using a second driver;

converting a third image signal into a differential signal using a third driver, and transmitting said differential image signal to said first bonding pad and said second bonding pad for output, wherein said differential signal is one of an LVDS signal and an RSDS signal;

disabling said third driver when said first image signal is outputted via said first bonding pad and said second image signal is outputted via said second bonding pad; and disabling said first driver and said second driver when said differential signal is outputted via said first bonding pad and said second bonding pad.

5. The output driving method as claimed in claim 4, wherein said first image signal and said second image signal are TTL (Transistor-Transistor Level) signals.

6. The output driving method as claimed in claim 5, wherein said first driver and said second driver are TTL (Transistor-Transistor Level) drivers.

7. An output driving device for processing a first image signal, a second image signal and a third image signal for display, comprising:

a first pad and a second pad;

a first driver for providing said first image signal at said first pad;

a second driver for providing said second image signal at said second pad, wherein said first image signal and said second image signal have one data rate; and a third driver for converting said third image signal into a differential signal at said first pad and said second pad, wherein said third image signal has another data rate;

wherein said another data rate is greater than said one data rate.

8. The output driving device as claimed in claim 7, wherein said first image signal and said second image signal are TTL signals.

9. The output driving device as claimed in claim 7, wherein said first image signal and said second image signal are TTL/TCON signals.

10. The output driving device as claimed in claim 7, wherein said differential signal is an LVDS signal.

11. The output driving device as claimed in claim 10, wherein said another data rate is substantially seven times of said one data rate.

12. The output driving device as claimed in claim 7, wherein said differential signal is an RSDS signal.

13. The output driving device as claimed in claim 12, wherein said another data rate is substantially two times of said one data rate.

14. The output driving device as claimed in claim 7, further comprising a control signal to disable said third driver when said first image signal is provided at said first pad and said second image signal is provided at said second pad and to disable said first driver and said second driver when said differential signal is provided at said first bonding pad and said second bonding pad.

15. An output driving method for processing a first image signal, a second image signal and a third image signal for display, comprising:

providing a first pad and a second pad;

providing said first image signal at said first pad;

providing said second image signal at said second pad, wherein said first image signal and said second image signal have one data rate;

converting said third image signal into a differential signal at said first pad and said second pad, wherein said third image signal has another data rate;

disabling said third driver when said first image signal is provided at said first pad and said second image signal is provided at said second pad; and disabling said first driver and said second driver when said differential signal is provided at said first pad and said second pad;

wherein said another data rate is greater than said one data rate.

16. The output driving method as claimed in claim 15, wherein said first image signal and said second image signal are TTL signals.

17. The output driving method as claimed in claim 15, wherein said first image signal and said second image signal are TTL/TCON signals.

18. The output driving method as claimed in claim 15, wherein said differential signal is an LVDS signal.

19. The output driving method as claimed in claim 18, wherein said another data rate is substantially seven times of said one data rate.

20. The output driving method as claimed in claim 15, wherein said differential signal is an RSDS signal.

21. The output driving method as claimed in claim 20, wherein said another data rate is substantially two times of said one data rate.

* * * * *